US008493589B2

(12) United States Patent
Nakamura

(10) Patent No.: US 8,493,589 B2
(45) Date of Patent: Jul. 23, 2013

(54) IMAGE FORMING APPARATUS WHICH PERFORMS A NOTIFICATION OF A PREDETERMINED ADJUSTMENT

(75) Inventor: Shoichi Nakamura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 160 days.

(21) Appl. No.: 13/225,736

(22) Filed: Sep. 6, 2011

(65) Prior Publication Data

US 2012/0062925 A1 Mar. 15, 2012

(30) Foreign Application Priority Data

Sep. 9, 2010 (JP) ................................ 2010-201505

(51) Int. Cl.
*G06F 3/12* (2006.01)

(52) U.S. Cl.
USPC ............................ 358/1.14; 358/1.15; 710/19

(58) Field of Classification Search
USPC .................................. 358/1.14, 1.15; 710/19
See application file for complete search history.

(56) References Cited

U.S. PATENT DOCUMENTS

2002/0031390 A1* 3/2002 Kobayashi et al. ........... 400/709
2006/0215212 A1* 9/2006 Tao ............................. 358/1.14
2012/0023269 A1* 1/2012 Wilson et al. .................. 710/19

FOREIGN PATENT DOCUMENTS

JP 07-237336 A 9/1995

* cited by examiner

*Primary Examiner* — Qian Yang
(74) *Attorney, Agent, or Firm* — Holtz, Holtz, Goodman & Chick, P.C.

(57) ABSTRACT

Disclosed is an image forming system including: a plurality of image forming apparatuses provided in a series so that each of the plurality of image forming apparatuses form an image on a sheet of paper, wherein the plurality of image forming apparatuses each include: an image forming section; and a control section which, when a predetermined adjustment condition occurs, stops an image forming operation, performs a predetermined adjustment, resumes the image forming operation after the adjustment is complete, and performs a notification that the adjustment is performed to the other image forming apparatus when the adjustment is performed, and when there is a notification that the adjustment is performed from the other image forming apparatus, the control section stops the driving of the image forming section and puts the image forming section in a driving stopped state while the adjustment is performed in the other image forming apparatus.

7 Claims, 15 Drawing Sheets

FIG.6A

| | |
|---|---|
| TIME A | 25 SECONDS |

FIG.6B

| | | |
|---|---|---|
| TIME B | STABILIZATION A | 10 SECONDS |
| | STABILIZATION B | 20 SECONDS |
| | STABILIZATION C | 60 SECONDS |
| | POTENTIAL CORRECTION | 15 SECONDS |

IMAGE FORMING APPARATUS WHICH PERFORMS A NOTIFICATION OF A PREDETERMINED ADJUSTMENT

BACKGROUND

1. Field of the Invention

The present invention relates to an image forming system.

2. Description of Related Art

Lately, there is known an image forming system in which a plurality of image forming apparatuses such as printers, copiers, etc. which form an image on paper are provided in a series and each image forming apparatus forms an image on one face of the paper to realize double face printing so that the productivity is enhanced.

Regarding such image forming system, Japanese Patent Application Laid-Open Publication No. 7-237336 describes a technique in which an intermediate buffer apparatus is provided between two printers, paper on which an image is formed on a front face by a first printer is sent to the intermediate buffer apparatus, and the paper is received by a second printer from the intermediate buffer apparatus and an image is formed on a back face by the second printer. In such image forming system, suitable double face printing is realized by stopping printing and paper feeding by the first printer or the second printer according to accumulated amount of paper in the intermediate buffer apparatus.

Since the content of image forming processing in each of the plurality of image forming apparatuses in such image forming system is different, suitable timing to perform adjustment for suitable image forming is different for each image forming apparatus. Therefore, when adjustment of one image forming apparatus starts during image forming processing of the other image forming apparatus, the other image forming apparatus needs to standby until the adjustment in the one image forming apparatus is complete.

However, in an image forming system as described in the above Japanese Patent Application Laid-Open Publication No. 7-237336, due to property of the configuration, it is necessary to monitor not only the accumulating amount of continuous paper in the intermediate buffer apparatus becoming large but also the amount becoming small, and based on the above, the control of driving the apparatuses in each of the two printers is performed. However, in an image forming system which includes a plurality of image forming apparatuses which perform image forming on each paper of a certain size instead of continuous paper, it is normal that the paper does not accumulate, and therefore such monitoring is not necessary.

In such image forming system, for example, when adjustment of an image forming apparatus in an upstream side is performed for a long period of time, an image forming apparatus in a downstream side cannot recognize this. Therefore, various apparatuses for performing image forming processing are on standby while being driven (idle running). Consequently, problems occur in the image forming apparatus such as deterioration of material and waste of energy of the apparatus, and therefore it is inefficient.

SUMMARY

The present invention has been made in consideration of the above problems, and it is one of main objects to provide an image forming system which can perform adjustment efficiently in any of a plurality of image forming apparatuses.

In order to achieve at least one of the above-described objects, according to an aspect of the present invention, there is provided an image forming system including:

a plurality of image forming apparatuses provided in a series so that each of the plurality of image forming apparatuses form an image on a sheet of paper, wherein the plurality of image forming apparatuses each include:

an image forming section which forms an image on the paper; and a control section which, when a predetermined adjustment condition occurs, stops an image forming operation by the image forming section, performs a predetermined adjustment, resumes the image forming operation by the image forming section after the adjustment is complete, and performs a notification that the adjustment is performed to the other image forming apparatus of the plurality of image forming apparatuses when the adjustment is performed, and when there is a notification that the adjustment is performed from the other image forming apparatus of the plurality of image forming apparatuses, the control section stops the driving of the image forming section and puts the image forming section in a driving stopped state while the adjustment is performed in the other image forming apparatus.

Preferably, in the image forming system, the control section of the plurality of image forming apparatuses each specify time necessary for the adjustment when there is the notification that the adjustment is performed from the other image forming apparatus, and when the specified time is less than a predetermined judgment time, the driving of the image forming section is not stopped and the image forming section is on standby in a ready state until the adjustment is complete.

Preferably, in the image forming system, each of the control section of the plurality of image forming apparatuses is able to perform a plurality of types of adjustment, and the control section performs the notification that the adjustment is performed to the other image forming apparatus so that it is possible to specify the type of the adjustment, and when there is a notification from the other image forming apparatus that the adjustment is performed, the control section specifies the time necessary for adjustment from the type of adjustment specified by the notification.

Preferably, in the image forming system, when there is a notification that the adjustment is performed from an image forming apparatus provided in an upstream side of a paper conveying direction among the plurality of image forming apparatuses, after the image forming processing by the image forming section is performed on a paper discharged from the image forming apparatus provided in the upstream side, when the time specified from the type of the adjustment specified from the notification that the adjustment is performed from the image forming apparatus provided in the upstream side is less than the time in which performing time of the image forming processing is added to the judgment time, the control section of an image forming apparatus provided in a downstream side puts the image forming section on standby in the ready state; and when there is a notification that the adjustment is performed from the image forming apparatus provided in the downstream side, when the time specified from the type of adjustment specified from the notification that the adjustment is performed from the image forming apparatus provided in the downstream side is less than the judgment time, the control section of the image forming apparatus provided in the upstream side puts the image forming section on standby in the ready state.

Preferably, in the image forming system, each of the control section of the plurality of image forming apparatuses is able to perform a plurality of types of adjustment, and the control section performs the notification that the adjustment is performed to the other image forming apparatus so that it is possible to specify the type of the adjustment, and when there is a notification from the other image forming apparatus that the adjustment is performed, the control section judges whether or not to put the image forming section in the driving stopped state based on the type of adjustment specified by the notification and when it is judged to put the image forming section in the driving stopped state, the image forming section is put in the driving stopped state, and when it is judged not to put the image forming section in the driving stopped state, the driving of the image forming section is not stopped, and the image forming section is put on standby in the ready state until the adjustment is complete.

Preferably, in the image forming system, the adjustment is image stabilizing processing to stabilize image forming in the image forming section.

Preferably, the image forming system further includes an accumulating apparatus which is provided between the plurality of image forming apparatuses, which receives and accumulates paper discharged from the image forming apparatus provided in an upstream side of a paper conveying direction and which sends out the accumulated paper to an image forming apparatus provided in a downstream side, wherein each of the control section of the plurality of image forming apparatuses discharges the paper on which image forming processing is performed by the image forming section outside the apparatus, and then puts the image forming section in the driving stopped state.

BRIEF DESCRIPTION OF THE DRAWINGS

The present invention will become more fully understood from the detailed description given hereinbelow and the appended drawings, and thus are not intended to define the limits of the present invention, and wherein;

FIG. 6A is a diagram for explaining time set in time (A);

FIG. 6B is a diagram for explaining time set in time (B);

DETAILED DESCRIPTION OF PREFERRED EMBODIMENTS

Below, an embodiment of an image forming system of the present invention is described with reference to the drawings. The scope of the invention is not limited to the illustrated examples.

Figure 1:
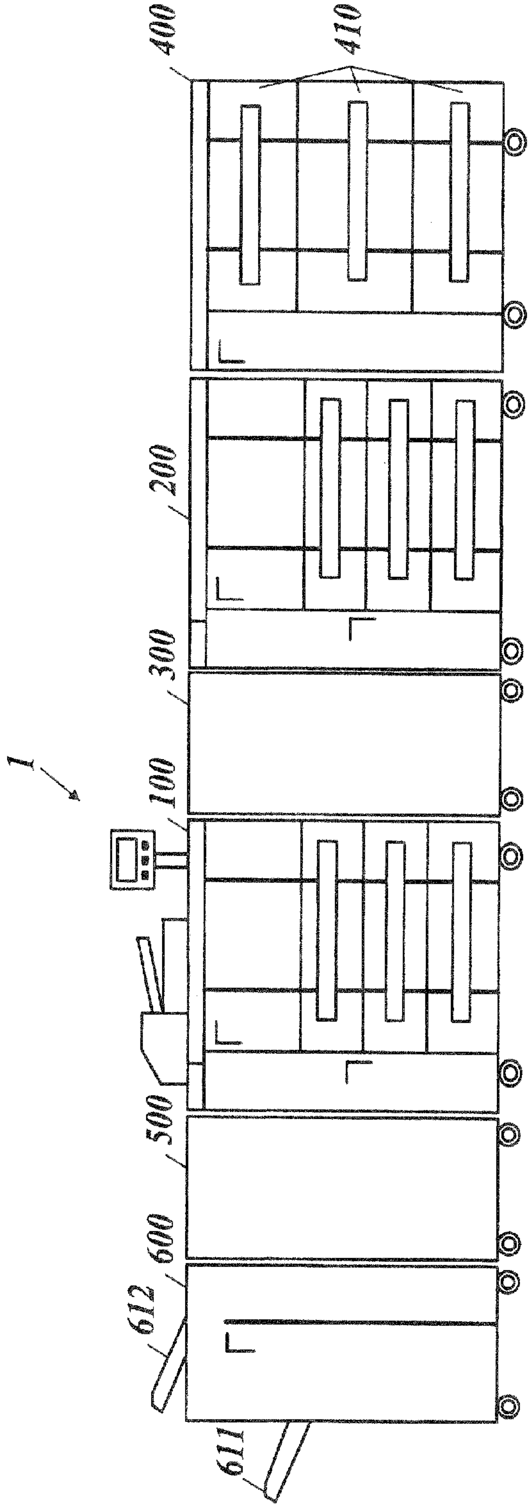
FIG. 1 is a diagram showing a schematic configuration of an image forming system.

For example, as shown in FIG. 1, the image forming system 1 of the present embodiment includes a first image forming apparatus 100, a second image forming apparatus 200, an intermediate buffer apparatus 300, a large capacity paper feeding apparatus 400, a relay conveying apparatus 500 and a post processing apparatus 600. The image forming system 1 employs a tandem configuration in which these apparatuses are provided in series. In the image forming system 1 of the present embodiment, each component is provided in a following order from an upstream side of a paper conveying direction, the large capacity paper feeding apparatus 400, the second image forming apparatus 200, the intermediate buffer apparatus 300, the first image forming apparatus 100, the relay conveying apparatus 500 and the post processing apparatus 600.

The image forming system 1 performs image forming in the first image forming apparatus 100 and the second image forming apparatus 200 on paper fed from a paper feeding tray provided in the large capacity paper feeding apparatus 400, the first image forming apparatus 100 and the second image forming apparatus 200, performs predetermined post processing in the post processing apparatus 600 and performs output of the paper (paper discharge). Here, the first image forming apparatus 100 and the second image forming apparatus 200 each perform image forming processing on one face of the paper. In other words, when image forming processing is performed on both faces of the paper, the second image forming apparatus 200 performs the image forming processing on one face of the paper, the intermediate buffer apparatus 300 performs reversing of the front and back of the paper, and the first image forming apparatus 100 performs image forming processing on the reversed paper.

Figure 2:
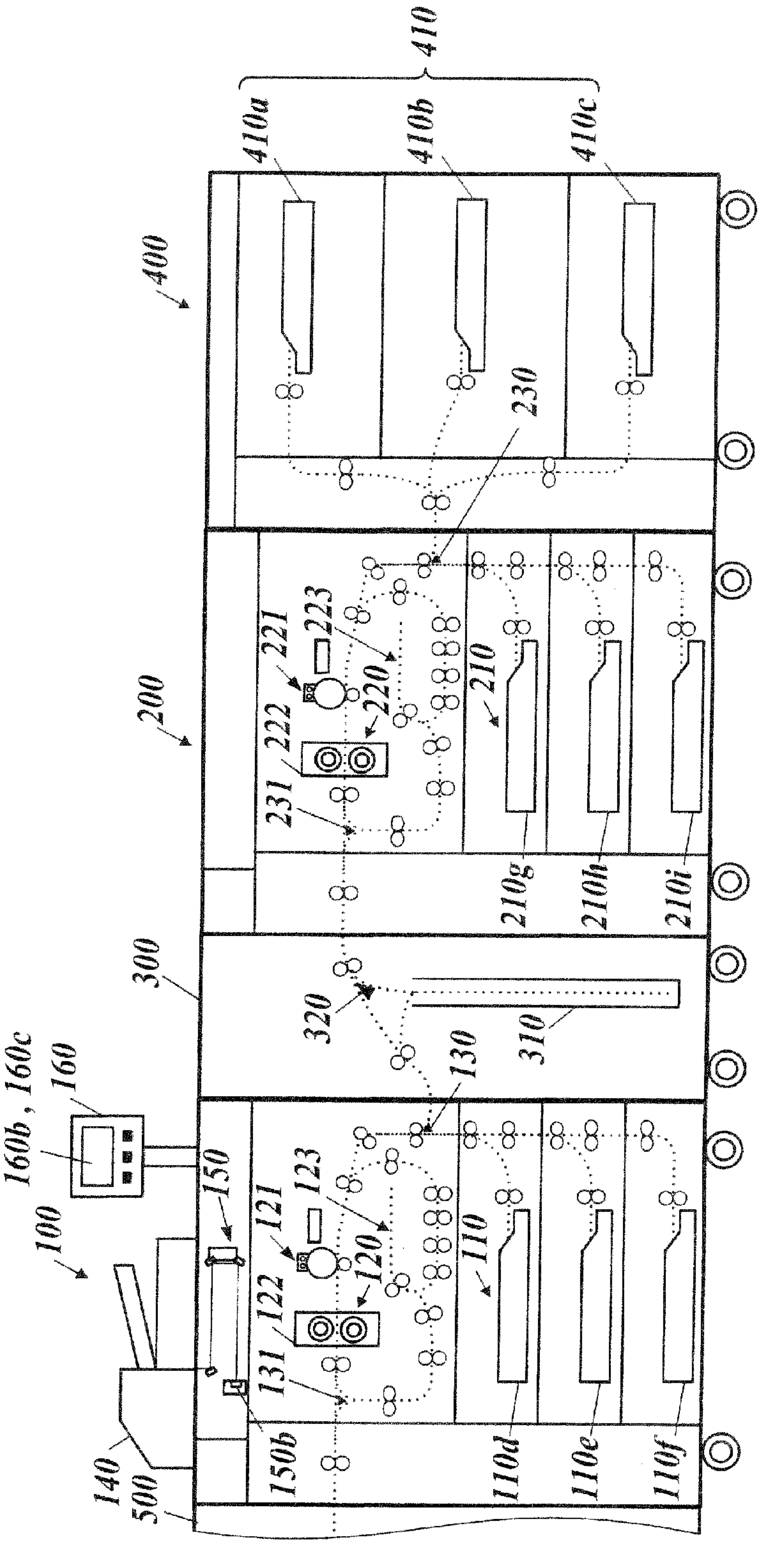
FIG. 2 is a diagram schematically showing an inner configuration of an image forming system.

As described in FIG. 2, the first image forming apparatus 100 includes a paper feeding tray 110, a print section 120, conveying path switching sections 130 and 131, an ADF (Auto Document Feeder) 140, an image reading section 150 and an operation/display section 160. In other words, the first image forming apparatus 100 of the present embodiment is a digital multifunction peripheral including a scanner function, a copying function and a printer function. In the present embodiment, either an image forming apparatus which forms a color image of four colors of CMYK or an image forming apparatus which forms a black and white image of one color can be employed.

The paper feeding tray 110 includes a plurality of trays 110*d* to 110*f*, and paper discriminated based on basis weight, size, etc. is stored in each tray according to type as set by the user. The paper stored in the paper feeding tray 110 is conveyed through a conveying path with a conveying roller which is not shown and conveyed to the print section 120. The print section 120 includes an image forming section 121 and a fixing section 122 and performs image forming processing of an electro-photographic method based on the input job data and image data.

The image forming section 121 scans a surface of a rotating image carrier uniformly charged by a charging section with a laser light source and a polygon mirror, and forms an electrostatic latent image corresponding to a document image on a face of the image carrier. Then, the image forming section 121 reversely develops the electrostatic latent image with the developing section and forms the toner image on the image carrier. Then, corresponding with the timing of the toner image forming, the image forming section 121 sends out the fed paper to a transfer area with a resist roller synchronized for alignment with the toner image formed on the image carrier. Then, the image forming section 121 transfers the toner image formed on the surface of the image carrier to the paper charged in the opposite polarity by the transfer section in the transfer area. Then, the image forming section 121 separates the paper holding the toner image from the surface of the image carrier with an action of a separating/electricity removing section and sends out the paper to the fixing section 122.

The fixing section 122 includes a heating roller which applies heat using a halogen heater and a pressurizing roller which applies pressure to the heating roller from the bottom. The fixing section 122 applies pressure and heat to the paper holding the toner image to perform fixing processing.

The conveying path switching section 130 switches the conveying path so that either the paper sent out from the intermediate buffer apparatus 300 or the paper sent out from the paper feeding tray 110 is conveyed to the print section 120.

The conveying path switching section 131 switches the conveying direction of the paper sent out from the fixing section 122 between the relay conveying apparatus 500 and the reversing section 123 for reversing the paper after fixing of one face is finished. The paper reversed by the reversing section 123 is sent out to the image forming section 121 again and the image forming processing is performed on the opposite face.

The ADF 140 automatically conveys the document placed on the tray for placing documents successively from the top to the image reading section 150.

The image reading section 150 performs reading processing of the document conveyed by the ADF 140. Specifically, the image reading section 150 scans the document with the light emitted from the light source, forms an image of the reflected light with a CCD (Charge Coupled Device) 150*b* and performs photoelectric conversion. Then, the image reading section 150 obtains a document image from the document read by photoelectric conversion.

The operation/display section 160 includes a display section 160*b* such as a LCD (Liquid Crystal Display), etc., a touch panel 160*c* provided to cover the display section 160*b*, operation key groups (not shown), and the like. The operation/display section 160 receives an instruction from the user and outputs the operation signal to a later described control section 181. The operation/display section 160 displays various setting screens to input various operation instructions and setting information, various processing results, and the like according to a display signal input from the control section 181.

As shown in FIG. 2, the second image forming apparatus 200 includes a paper feeding tray 210, a print section 220, and conveying path switching sections 230 and 231.

The paper feeding tray 210 includes a plurality of trays 210*g* to 210*i*, and paper discriminated based on basis weight, size, etc. is stored in each tray according to type as set by the user. The paper stored in the paper feeding tray 210 is conveyed through a conveying path with a conveying roller which is not shown and conveyed to the print section 220.

The print section 220 includes an image forming section 221 and a fixing section 222 and performs image forming processing of an electro-photographic method based on the input job data and image data. The configuration of the image forming section 221 and the fixing section 222 are similar to the image forming section 121 and the fixing section 122 of the first image forming apparatus 100 and therefore the detailed description is omitted.

The conveying path switching section 230 switches the conveying path so that either the paper sent out from the large capacity paper feeding apparatus 400 or the paper sent out from the paper feeding tray 210 is conveyed to the print section 220.

The conveying path switching section 231 switches the conveying direction of the paper sent out from the fixing section 222 between the intermediate buffer apparatus 300 and the reversing section 223 for reversing the paper after fixing of one face is finished. The paper reversed by the reversing section 223 is sent out to the image forming section 221 again and the image forming processing is performed on the opposite face.

As shown in FIG. 2, the intermediate buffer apparatus 300 as an accumulating apparatus includes a buffer section 310 and a conveying path switching section 320. The buffer section 310 can receive paper discharged from the second image forming apparatus 200 and accumulate a plurality of sheets of paper. The buffer section 310 reverses the front and back of the accumulated paper and sends out the paper to the first image forming apparatus 100 one sheet at a time. The conveying path switching section 320 switches the conveying direction of the paper received from the second image forming apparatus 200 between the buffer section 310 and the first image forming apparatus 100. The conveying path switching section 320 switches the conveying direction according to an instruction by a user or content of the performed job.

As shown in FIG. 2, the large capacity paper feeding apparatus 400 includes a paper feeding tray 410.

The paper feeding tray 410 includes a plurality of trays 410*a* to 410*c*, and paper discriminated based on basis weight, size, etc. is stored in each tray according to type as set by the user. The paper stored in the paper feeding tray 410 is conveyed with a conveying roller which is not shown and conveyed to the second image forming apparatus 200.

The relay conveying apparatus 500 is a conveying apparatus which relays paper from the first image forming apparatus 100 to the post processing apparatus 600 so as not to reduce efficiency of the entire system when there is a difference between the processing ability of the first image forming apparatus 100 and the processing ability of the post processing apparatus 600. Regarding the specific configuration, for example, a configuration similar to the intermediate buffer apparatus 300 can be employed.

The post processing apparatus 600 performs predetermined post processing on paper discharged from the relay conveying apparatus 500. The post processing performed by the post processing apparatus 600 includes, for example, sorting processing, cutting processing, hole punching processing, stapling processing, wrap binding processing, etc. The post processing apparatus 600 includes paper discharging trays 611 and 612, and paper on which post processing is performed is discharged to the paper discharging trays 611 and 612.

Next, the functional configuration of the image forming system 1 is described with reference to FIG. 3.

Figure 3:
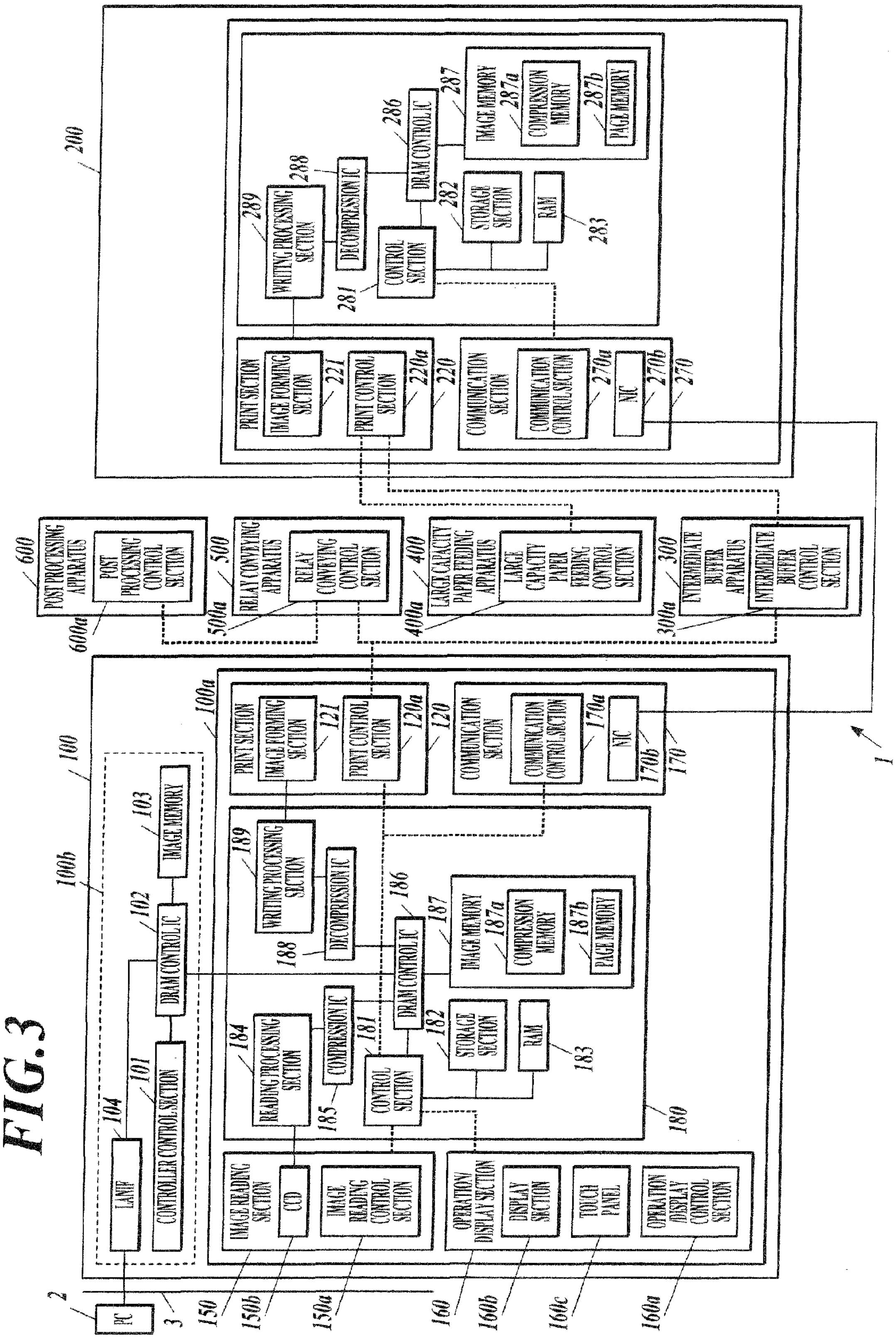
FIG. 3 is a block diagram showing a functional configuration of an image forming system.

As shown in FIG. 3, the image forming system 1 includes a first image forming apparatus 100, a second image forming apparatus 200, an intermediate buffer apparatus 300, a large capacity paper feeding apparatus 400, a relay conveying apparatus 500, and a post processing apparatus 600.

The first image forming apparatus 100 includes a main body section 100*a* and a printer controller 100*b*. The first image forming apparatus 100 is connected to a PC 2 on a network 3 through a LANIF (Local Area Network InterFace) 104 of the printer controller 100*b* so that data can be transmitted and received between each other. In the present embodiment, the first image forming apparatus 100 functions as the master apparatus which performs control and management of the first image forming apparatus 100 and the second image forming apparatus 200.

The main body section 100*a* includes a print section 120, an image reading section 150, an operation/display section 160, a communication section 170 and an image control substrate 180. The same reference numeral is applied to the configuration which is the same as the sections described in FIG. 1 and FIG. 2, and the description is omitted.

The image control substrate 180 includes a control section 181, a storage section 182, a RAM (Random Access Memory) 183, a reading processing section 184, a compression IC 185, a DRAM (Dynamic Random Access Memory) control IC 186, an image memory 187, a decompression IC 188 and writing processing section 189.

The control section 181 includes a CPU (Central Processing Unit), etc. The control section 181 reads out a program specified from a system program and various application programs stored in the storage section 182 and expands the program in the RAM 183. In coordination with the program expanded in the RAM 183, the control section 181 performs various processing and centrally controls each section of the first image forming apparatus 100.

The storage section 182 includes a nonvolatile memory, etc. such as a semiconductor or the like, and stores the above described system program, various application programs, various data, etc. Such programs are stored in a format of a program code readable by a computer, and the control section 181 sequentially performs the operation according to the program code. The storage section 182 stores, for example, a master side print control program for performing later described master side print control processing and correction start notification reception occasion (M) program for performing correction start notification reception occasion (M) processing.

The RAM 183 functions as a work area for temporarily storing various programs performed by the control section 181 and various pieces of data regarding the programs.

The reading processing section 184 performs various processing such as analog signal processing, A/D conversion processing, shading processing, etc. on an analog image signal input from the image reading section 150 to generate digital image data and outputs the data to the compression IC 185.

The compression IC 185 performs compression processing on the input digital image data and outputs the data to the DRAM control IC 186.

According to an instruction from the control section 181, the DRAM control IC 186 performs control of compression processing of image data by the compression IC 185 and decompression processing of compressed image data by the decompression IC 188 and also performs input and output control of image data between the image memory 187.

For example, when the control section 181 instructs storage of image data read by the image reading section 150, the DRAM control IC 186 allows the compression IC 185 to perform compression processing of the image data input from the reading processing section 184 and stores the compressed image data in a compression memory 187*a* of the image memory 187. When the control section 181 instructs print output of compressed image data stored in the compression memory 187*a*, the DRAM control IC 186 reads out compressed image data from the compression memory 187*a*, allows the decompression IC 188 to perform the decompression processing and stores the decompressed image data in a page memory 187*b*. Then, the DRAM control IC 186 reads out the uncompressed image data from the page memory 187*b* and outputs the data to the writing processing section 189. After the image forming by the print section 120, the DRAM control IC 186 deletes the image data of the image already formed from the image memory 187.

The DRAM control IC 186 outputs the setting information of the job input from the printer controller 100*b* to the control section 181.

The image memory 187 is composed of, for example a DRAM which is a volatile memory and includes the compression memory 187*a* and the page memory 187*b*. The compression memory 187*a* is a memory for storing compressed image data, and the page memory 187*b* is a memory for temporarily storing uncompressed image data regarding the image forming before performing image forming.

The decompression IC 188 performs decompression processing on compressed image data.

The writing processing section 189 generates PWM (Pulse Width Modulation) signal based on image data input from the decompression IC 188 and outputs the signal to the print section 120.

The image reading section 150 includes an image reading control section 150*a*. The image reading control section 150*a* controls driving of each section of the image reading section 150 such as the CCD 150*b*, etc. based on a control signal from the control section 181 and obtains a document image as described above. The obtained document image is output to the reading processing section 184.

The operation/display section 160 includes an operation/display control section 160*a*. The operation/display control section 160*a* performs control of the display of the display section 160*b* based on a control signal from the control section 181. The operation/display control section 160*a* outputs an operation signal input from the operation key group or touch panel 160*c* to the control section 181.

The print section 120 includes a print control section 120*a*. The print control section 120*a* performs data communication between the control section 181 and based on the control signal from the control section 181, the print control section 120*a* controls the operation of each section of the print section 120, such as forming an image on a paper based on the PWM signal input from the writing processing section 189. The print control section 120*a* performs data communication with the intermediate buffer apparatus 300 and as described later, performs communication regarding, for example, whether or not it is possible for the intermediate buffer apparatus 300 to discharge paper. The print control section 120*a* performs data communication with the relay conveying apparatus 500 and performs, for example, instruction of post processing to the relay conveying apparatus 500 and the post processing apparatus 600.

The communication section 170 includes a communication control section 170*a* and an NIC (Network Interface Card) 170*b*. The NIC 170*b* is a communication interface for connecting with the second image forming apparatus 200 and performs transmitting and receiving of data with the second image forming apparatus 200. The communication control section 170*a* performs control of transmitting job data and image data transmitted from the control section 181 to the second image forming apparatus 200 through the NIC 170*b* based on a control signal from the control section 181. Specifically, the compressed image data stored in the compression memory 187*a* is read out by the DRAM control IC 186, and after temporarily storing the data in a system memory included in the control section 181, the data is output at a predetermined timing to the communication control section 170*a*. Then, the compressed image data input in the communication control section 170*a* is transmitted to the second image forming apparatus 200 with the NIC 170*b*. Then, as described later, the communication control section 170*a* performs notification of start of correction and type of correction to the second image forming apparatus 200 according to an instruction of the control section 181.

The printer controller 100*b* performs management and control of the image data and the job input to the first image forming apparatus 100 from the PC 2 connected to the network 3 when the image forming system 1 is used as a network printer.

The printer controller 100*b* includes a controller control section 101, a DRAM control IC 102, an image memory 103, a LANIF 104 and the like.

The controller control section 101 centrally controls the operation of each section of the printer controller 100*b* and transmits the data input from the PC 2 to the main body section 100*a* as a job through the LANIF 104.

The DRAM control IC 102 controls storing of data received by the LANIF 104 in the image memory 103, and read out of data from the image memory 103. The DRAM control IC 102 is connected to the DRAM control IC 186 of the image control substrate 180 by a PCI (Peripheral Components Interconnect) bus and according to an instruction from the controller control section 101, the DRAM control IC 102 reads out data of a print target from the image memory 103 and outputs the data to the DRAM control IC 186.

The image memory 103 includes a DRAM and temporarily stores the input output data.

The LANIF 104 is a communication interface for connecting to the network 3 such as a LAN including NIC, modem, etc. and receives data from the PC 2. The received data is output to the DRAM control IC 102.

The second image forming apparatus 200 includes a main body section 200*a*. In the present embodiment, the second image forming apparatus 200 functions as a slave apparatus which performs operation based on an instruction from the first image forming apparatus 100.

The main body section 200*a* includes a print section 220, a communication section 270 and an image control substrate 280.

The image control substrate 280 includes a control section 281, a storage section 282, a RAM 283, a DRAM control IC 286, an image memory 287, a decompression IC 288 and a writing processing section 289.

The control section 281 includes a CPU, etc. reads out a specified program from a system program and various application programs stored in the storage section 282 and expands the program in the RAM 283. In coordination with the program expanded in the RAM 283, the control section 281 performs various processing and centrally controls each section of the second image forming apparatus 200.

The storage section 282 includes a nonvolatile memory, etc. such as a semiconductor or the like, and stores the above described system program, various application programs, various pieces of data, etc. Such programs are stored in a format of a program code readable by a computer, and the control section 281 sequentially performs the operation according to the program code. The storage section 282 stores, for example, a slave side print control program for performing later described slave side print control processing and correction start notification reception occasion (S) program for performing correction start notification reception occasion (S) processing.

The RAM 283 functions as a work area for temporarily storing various programs performed by the control section 281 and various pieces of data regarding the programs.

According to an instruction from the control section 281, the DRAM control IC 286 performs control of decompression processing of compressed image data by the decompression IC 288 and also performs input and output control of image data between the image memory 287.

For example, when the control section 281 instructs storage of image data transmitted from the first image forming apparatus 100, the DRAM control IC 286 stores the compressed image data from the first image forming apparatus 100 in a compression memory 287*a* of the image memory 287. When the control section 281 instructs print output of compressed image data stored in the compression memory 287*a*, the DRAM control IC 286 reads out the compressed image data from the compression memory 287*a*, allows the decompression IC 288 to perform the decompression processing and stores the decompressed image data in a page memory 287*b*. Then, the DRAM control IC 286 reads out the uncompressed image data from the page memory 287*b* and outputs the data to the writing processing section 289. After the image forming by the print section 220, the DRAM control IC 286 deletes the image data of the image already formed from the image memory 287.

The image memory 287 is composed of, for example a DRAM which is a volatile memory and includes a compression memory 287*a* and a page memory 287*b*. The functional configuration of the compressed memory 287*a* and the page memory 287*b* is similar to that of the compression memory 187*a* and the page memory 187*b* of the first image forming apparatus 100, and therefore the detailed description is omitted.

The decompression IC 288 performs decompression processing on compressed image data.

The writing processing section 289 generates PWM signal based on image data input from the decompression IC 288 and outputs the signal to the print section 220.

The print section 220 includes a print control section 220*a*. The print control section 220*a* performs data communication between the control section 281 and based on the control signal from the control section 281, the print control section 220*a* controls the operation of each section of the print section 220, such as forming an image on a paper based on the PWM signal input from the writing processing section 289. The print control section 220*a* performs data communication with the large capacity paper feeding apparatus 400 and instructs supplying of paper, etc. to the large capacity paper feeding apparatus 400 based on a control signal from the control section 281. The print control section 220*a* performs data communication with the intermediate buffer apparatus 300 and as described later, performs notification of discharge of paper to the intermediate buffer apparatus 300.

The communication section 270 includes a communication control section 270*a* and an NIC 270*b*. The NIC 270*b* is a communication interface for connecting with the first image forming apparatus 100 and performs transmitting and receiving of data with the first image forming apparatus 100. As described later, the communication control section 270*a* performs notification of start of correction and type of correction to the first image forming apparatus 100 according to an instruction of the control section 281.

The intermediate buffer apparatus 300 includes an intermediate buffer control section 300*a*, and the intermediate buffer control section 300*a* controls each section of the intermediate buffer apparatus 300 based on communication with the first image forming apparatus 100 and the second image forming apparatus 200. Specifically, for example, the intermediate buffer control section 300*a* performs control of receiving paper discharged from the second image forming apparatus 200 based on a notification of paper discharge from the second image forming apparatus 200 and performs control of sending out paper to the first image forming apparatus 100 based on a notification of paper discharge authorization from the first image forming apparatus 100.

The large capacity paper feeding apparatus 400 includes a large capacity paper feeding control section 400*a* and controls each section of the large capacity paper feeding apparatus 400. Specifically, for example, the large capacity paper feeding control section 400*a* performs control of supplying paper to the second image forming apparatus 200 according to an instruction from the second image forming apparatus 200.

The relay conveying apparatus 500 includes a relay conveying control section 500*a*, and the relay conveying control section 500*a* controls each section of the relay conveying apparatus 500. Specifically, for example, according to an instruction from the first image forming apparatus 100, the relay conveying control section 500*a* receives paper discharged from the first image forming apparatus 100 and performs instruction of post processing to the post processing apparatus 600.

The post processing apparatus 600 includes a post processing control section 600*a* and controls each section of the post processing apparatus 600. Specifically, for example, the post processing control section 600*a* performs control of post processing on the conveyed paper according to an instruction from the relay conveying apparatus 500.

The image forming operation of a double face print job in the image forming system 1 as configured above is described with reference to FIG. 4. In the example described in FIG. 4, the image forming processing is performed on the front and the back of two sheets of paper, however, the invention is not limited to the above. Moreover, image forming can be performed similarly in a copying job.

Figure 4:
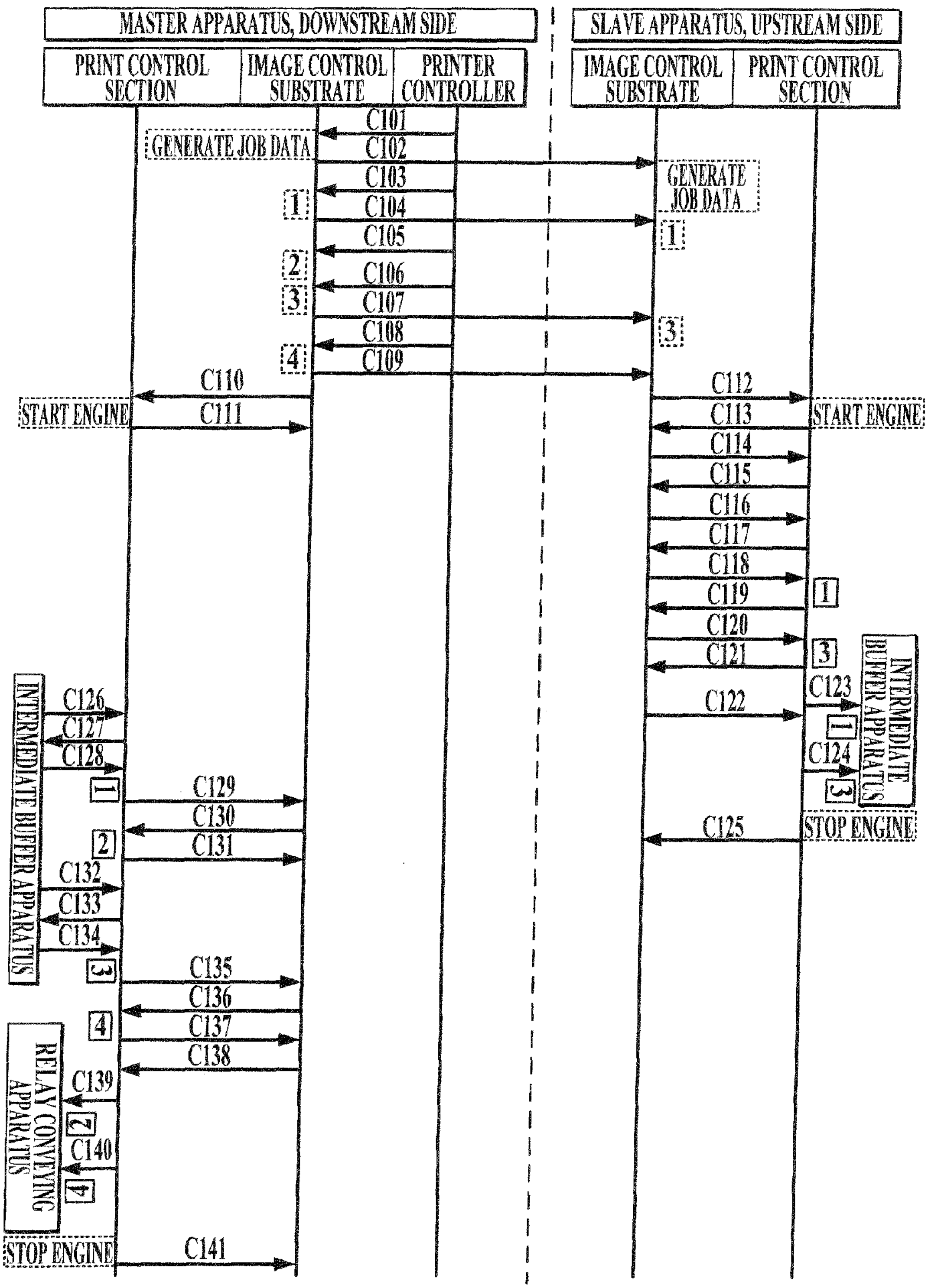
FIG. 4 is a diagram for explaining a process of image forming operation in the plurality of image forming apparatuses.

First, as shown in FIG. 4, when the job start data indicating the start of the job is input from the PC 2, the printer controller 100*b* of the first image forming apparatus 100 (master apparatus) transmits the job start data to the control section 181 in the image control substrate 180 (step C101). Based on the job start data, the control section 181 generates job data indicating the operation of the job in the image forming system 1 and also transmits the job start data to the control section 281 of the image control substrate 280 of the second image forming apparatus 200 (slave apparatus) (step C102). When the job start data is received, the control section 281 of the slave apparatus similarly performs generation of job data.

The following image forming processing is performed based on the job data generated as described above in the master apparatus and the slave apparatus.

When the job data is generated and the image data of the first page (front face of the first sheet of paper) is transmitted from the PC 2 to the printer controller 100*b*, the printer controller 100*b* transmits the data to the DRAM control IC 186 of the image control substrate 180, and after compression is performed as described above, the data is transmitted to the control section 181 (step C103). Then, when the image data of the first page is input, the control section 181 transmits the data to the control section 281 of the slave apparatus which performs the image forming of the first page (step C104). When the image data of the first page is input, the control section 281 of the slave apparatus stores the image data in the compression memory 287*a* as described above.

When the image data of the second page (back face of the first sheet of paper) is transmitted from the PC 2 to the printer controller 100*b*, the printer controller 100*b* transmits the data to the DRAM control IC 186 to the image control substrate 180, and after performing compression as described above, in order to perform the image forming of the second page in the master apparatus, the image data of the second page is held in the compression memory 187*a* (step C105).

When the image data of the third page (front face of the second sheet of paper) is transmitted from the PC 2 to the printer controller 100*b*, the printer controller 100*b* transmits the data to the DRAM control IC 186 in the image control substrate 180, and after performing the compression as described above, the data is transmitted to the control section 181 (step C106). Then, when the third page of the image data is input, the control section 181 transmits the data to the control section 281 of the slave apparatus which performs the image forming of the third page (step C107). When the image data of the third page is input, the control section 281 of the slave apparatus stores the image data in the compression memory 287*a* as described above.

When the image data of the fourth page (back face of the second sheet of paper) is transmitted from the PC 2 to the printer controller 100*b*, the printer controller 100*b* transmits the data to the DRAM control IC 186 of the image control substrate 180, and after performing compression as described above, in order to perform image forming of the fourth page in the master apparatus, the image data of the fourth page is held in the compression memory 187*a* (step C108).

After the compression and transfer of image data of all of the pages is performed as described above, the control section 181 of the master apparatus performs notification that the transfer of the image data is complete to the control section 281 of the slave apparatus through the communication section 170 (step C109).

In the present embodiment, only the image data of the pages where image forming is performed in the slave apparatus is transferred, however, image data of all of the pages can be transferred.

After the notification that transfer is complete is performed, the control section 181 of the master apparatus performs print start notification, which is an instruction to start the print engine such as the image forming section 121, fixing section 122, etc., to the print control section 120*a* of the print section 120 in order to perform the image forming operation (step C110). When the print start notification is received, the print control section 120*a* starts the print engine, and when the print engine is in a state so that image forming can be performed, the print control section 120*a* performs a ready notification to the control section 181 (step C111).

When the notification that transfer is complete is received, the control section 281 of the slave apparatus performs print start notification, which is an instruction to start the print engine such as the image forming section 221, fixing section 222, etc., to the print control section 220*a* of the print section 220 in order to perform the image forming operation (step C112). When the print start notification is received, the print control section 220*a* starts the print engine, and when the print engine is in a state so that image forming can be performed, the print control section 120*a* performs a ready notification to the control section 281 (step C113).

The control section 281 of the slave apparatus performs a notification of instruction of feeding the first sheet of paper to the print control section 220*a* (step C114). When the paper feeding instruction is received, the print control section 220*a* selects any one of the trays 210*g* to 210*i* and trays 410*a* to 410*c* of the large capacity paper feeding apparatus 400 and performs control of feeding the first sheet of paper. Then, when the paper feeding is complete, the print control section 220*a* performs the paper feeding complete notification to the control section 281 (step C115).

Next, the control section 281 of the slave apparatus performs notification of instruction of feeding the second sheet of paper to the print control section 220*a* (step C116). When the paper feeding instruction is received, the print control section 220*a* selects any one of the trays 210*g* to 210*i* and trays 410*a* to 410*c* of the large capacity paper feeding apparatus 400 and performs control of feeding the second sheet of paper. Then, when the paper feeding is complete, the print control section 220*a* performs the paper feeding complete notification to the control section 281 (step C117).

Next, the control section 281 of the slave apparatus transmits a print instruction to perform the image forming of the first page on the front face of the first sheet of paper to the print control section 220*a* (step C118). When the print instruction is received, the print control section 220*a* allows the image forming section 221 to perform image forming of the first page on the first sheet of paper. Then, when the image forming of the first page ends, the print control section 220*a* performs a print complete notification to the control section 281 (step C119).

Next, the control section 281 of the slave apparatus transmits a print instruction to perform the image forming of the third page on the front face of the second sheet of paper to the print control section 220*a* (step C120). When the print instruction is received, the print control section 220*a* allows the image forming section 221 to perform image forming of the third page on the second sheet of paper. Then, when the image forming of the third page ends, the print control section 220*a* performs a print complete notification to the control section 281 (step C121).

When the print complete notification corresponding to the third page is received, the control section 281 of the slave apparatus determines that the image forming of all pages in the slave apparatus ended, and performs a stop instruction notification which is an instruction to stop the print engine to the print control section 220*a* (step C122).

At the timing of discharging the first sheet from the second image forming apparatus 200, the print control section 220*a* performs a paper discharge notification of the first sheet of paper to the intermediate buffer control section 300*a* of the intermediate buffer apparatus 300 (step C123).

At the timing of discharging the second sheet of paper from the second image forming apparatus 200, the print control section 220*a* performs a paper discharge notification of the second sheet of paper to the intermediate buffer control section 300*a* (step C124). In the present image forming processing, since this is the last sheet discharged from the second image forming apparatus 200, together with the paper discharge notification, a notification indicating that the sheet is the last sheet is also performed. The notification indicating that the sheet is the last sheet is not limited to when the sheet is the last sheet of the job and for example, when the image forming processing is interrupted due to error, etc., the notification is performed when the sheet is the last sheet among the sheets of paper processed at the point in time.

Then, after the stop instruction notification is received and the discharge of the last sheet of paper is complete, the print control section 220*a* stops the print engine and then performs engine stop complete notification to the control section 281 (step C125).

When the paper discharged from the slave apparatus is received, the intermediate buffer control section 300*a* of the intermediate buffer apparatus 300 performs a paper discharge inquiry notification to the print control section 120*a* of the master apparatus on whether or not it is possible to discharge paper to the first image forming apparatus 100 (step C126). The timing of paper discharge inquiry notification is not limited to when the paper is received, and can be performed when the paper discharge notification is received from the slave apparatus.

When there is a paper discharge inquiry notification from the intermediate buffer control section 300*a*, the print control section 120*a* of the master apparatus starts the print engine, confirms that the print engine is in a state where image forming is possible, and performs paper discharge authorization notification to the intermediate buffer control section 300*a* (step C127).

Then, when the paper discharge authorization notification is received, the intermediate buffer control section 300*a* sends out the first sheet of paper stacked in the buffer section 310 to the first image forming apparatus 100 and performs a paper discharge notification of the first sheet of paper to the print control section 120*a* of the master apparatus (step C128).

Until there is a paper discharge authorization notification, the intermediate buffer apparatus 300 stacks the received paper in the buffer section 310 and stays on standby.

When the first sheet of paper is conveyed from the intermediate buffer apparatus 300, the print control section 120*a* of the master apparatus performs a print request notification which requests image forming on the first sheet of paper to the control section 181 (step C129).

Then, when there is a print request notification, the control section 181 of the master apparatus transmits a print instruction to perform the image forming of the second page on the back face of the first sheet of paper to the print control section 120*a* (step C130). When the print instruction is received, the print control section 120*a* allows the image forming section 121 to perform the image forming of the second page on the first sheet of paper. Then, when the image forming of the second page ends, the print control section 120*a* performs the print complete notification to the control section 181 (step C131).

Next, when the discharged second sheet of paper is received from the slave apparatus, the intermediate buffer control section 300*a* of the intermediate buffer apparatus 300 performs a paper discharge inquiry notification to the print control section 120*a* of the master apparatus (step C132).

When there is a paper discharge inquiry notification from the intermediate buffer control section 300*a*, after the image forming of the first sheet ends, the print control section 120*a* of the master apparatus performs paper discharge authorization notification to the intermediate buffer control section 300*a* (step C133).

Then, when the paper discharge authorization notification is received, the intermediate buffer control section 300*a* sends out the second sheet of paper stacked in the buffer section 310 to the first image forming apparatus 100 and also performs the paper discharge notification of the second sheet of paper to the print control section 120*a* of the master apparatus (step C134). The second sheet of paper is the last sheet, and therefore together with the paper discharge notification, notification indicating that the sheet is the last sheet is also performed.

When the second sheet of paper is conveyed from the intermediate buffer apparatus 300, the print control section 120*a* of the master apparatus performs a print request notification which requests image forming on the second sheet of paper to the control section 181 (step C135). At this time, the print control section 120*a* also performs notification that the sheet is the last sheet to the control section 181.

Then, when there is a print request notification, the control section 181 of the master apparatus transmits a print instruction to the print control section 120*a* to perform the image forming of the fourth page on the back face of the second sheet of paper (step C136). When the print instruction is received, the print control section 120*a* allows the image forming section 121 to perform the image forming of the fourth page on the second sheet of paper. Then, when the image forming of the fourth page is finished, the print control section 120*a* performs the print complete notification to the control section 181 (step C137).

When a print complete notification corresponding to the fourth page is received, the control section 181 of the master apparatus judges that the image forming is finished to the last sheet and performs a stop instruction notification which is an instruction to stop the print engine to the print control section 120*a* (step C138).

The print control section 120*a* of the master apparatus sequentially performs the discharge of the first and the second sheet of paper to the relay conveying apparatus 500 (step C139 and step C140).

Then, after the stop instruction notification is received, the discharge of the last sheet of paper is complete, and the post processing in the post processing apparatus 600 is complete, the print control section 120*a* stops the print engine and then performs an engine stop complete notification to the control section 181 (step C141).

Then, for example, post processing by the post processing apparatus 600 is performed on the paper with the image formed as described above, and then the paper is discharged to the paper discharge trays 611 and 612.

Figure 5:
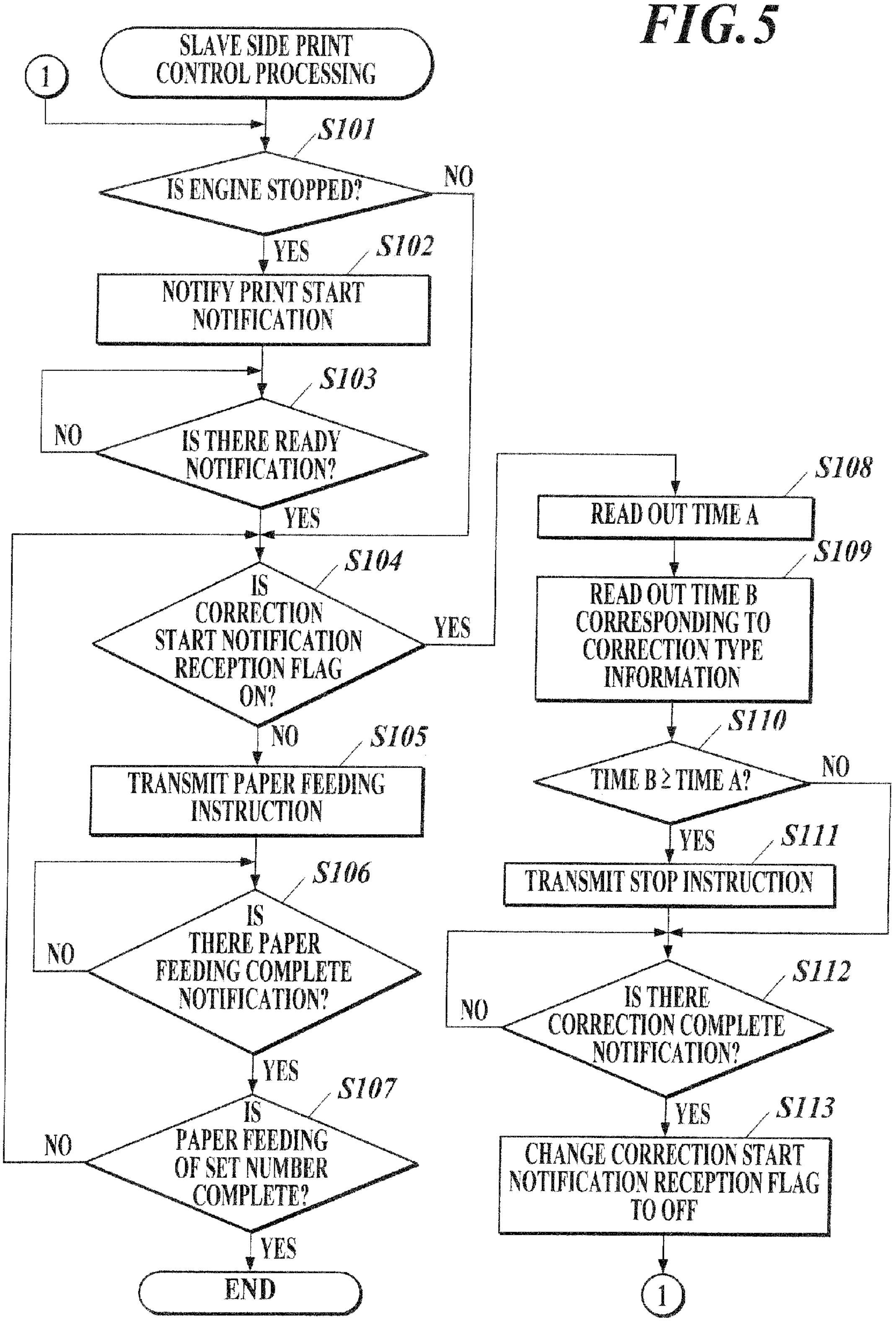
FIG. 5 is a flowchart showing slave side print control processing.

Next, the slave side print control processing performed in the second image forming apparatus 200 is described with reference to FIG. 5. The slave side print control processing is processing performed when there is a notification that the transfer of image data from the first image forming apparatus 100 which is the master apparatus is complete.

First, when there is an image data transfer complete notification and the processing is performed, the control section 281 judges whether or not the print engine is stopped (step S101). When it is judged that the print engine is stopped (step S101: YES), the control section 281 performs the print start notification to the print control section 220*a* (step S102). Then, the control section 281 waits for the ready notification from the print control section 220*a* (step S103) and performs the processing of step S104. When it is judged that the print engine is not stopped in step S101 (step S101; NO), the control section 281 does not perform the processing of step S102 and step S103 and performs the processing of step S104.

In step S104, the control section 281 judges whether or not a later described correction start notification reception flag is ON (step S104). When it is judged that the correction start notification reception flag is not ON (step S104; NO), the control section 281 transmits the paper feeding instruction to the print control section 220*a* (step S105), the control section 281 waits for the paper feeding complete notification from the print control section 220*a* (step S106), and the control section 281 judges whether or not the paper feeding of the number of sheets to be fed set in the job data is complete (step S107). When it is judged that the paper feeding of the set number of sheets to be fed is complete (step S107; YES), the control section 281 ends the processing, and when it is judged that the paper feeding of the set number of sheets is not complete (step S107; NO), the processing of step S104 is performed.

In step S104, when it is judged that the correction start notification reception flag is ON (step S104: YES), the control section 281 reads out the data indicating time (A) from the storage section 282 (step S108). Here, the time (A) is a constant number stored in the storage section 282 in a table as shown in FIG. 6A, and the time (A) indicates a predicted time from when a stop instruction is transmitted and the print engine stops, the print start notification also performed at this timing and the print engine starts, until when the print engine is in a ready state. In the present embodiment time (A) is set as 25 seconds, however, any time can be set according to the performance, etc. of the print engine.

Next, the control section 281 reads out time (B) corresponding to the information indicating a correction type transmitted from the first image forming apparatus 100 from the storage section 282 (step S109). Here, the time (B) is a constant number stored in the storage section 282 in a table as shown in FIG. 6B, and the time (B) indicates a predicted performing time of correction performed in the first image forming apparatus 100 (master apparatus). The types of correction performed in the first image forming apparatus 100 are stabilization A, stabilization B, stabilization C and potential correction, and the predicted performing time of correction is set at 10 seconds, 20 seconds, 60 seconds and 15 seconds respectively. In the stabilization A, for example, toner is not put on the image carrier, and the image carrier is idly run for a predetermined amount of time to remove the noise in a streak which occurs on the image carrier. In the stabilization B, for example, a patch image is formed on the image carrier and the density is measured to perform output adjustment of the laser light source. In the stabilization C, for example, a patch image is formed on the paper, the density of the patch is measured by a density measuring instrument provided in a predetermined position on the conveying path of the paper, and γ correction is performed based on the measurement. In the potential correction, the charged amount of the image carrier is measured and the output adjustment of the charging section is performed. Such correction is performed, for example for every predetermined number of pages of image forming. The types of correction are not limited to those described above and various types can be employed. In other words, any type can be employed as long as the image forming operation by the image forming section can be stopped, a predetermined adjustment on a predetermined member can be performed, and the image forming operation can be resumed after the adjustment is complete. The number of types of correction is not limited to the above described number of four types and can be a number of types other than the above, and can also be one type.

Then, the control section 281 compares the read out time (A) and time (B), and judges whether or not the time (B) is the time (A) or more (step S110). In other words, the control section 281 judges whether or not it is efficient to stop the print engine while the correction is performed. Here, whether or not to stop the print engine can be judged based on correction type. When it is judged that the time (B) is the time (A) or more (step S110; YES), the control section 281 performs stop instruction notification to the print control section 220*a* (step S111), waits for the correction complete notification from the master apparatus (step S112), and after the correction start notification reception flag is changed to OFF (step S113), the control section 281 performs the processing of step S101. When it is judged that the time (B) is not the time (A) or more (step S110; NO) in step S110, the control section 281 does not perform the processing of step S111 and performs the processing of step S112.

Figure 7:
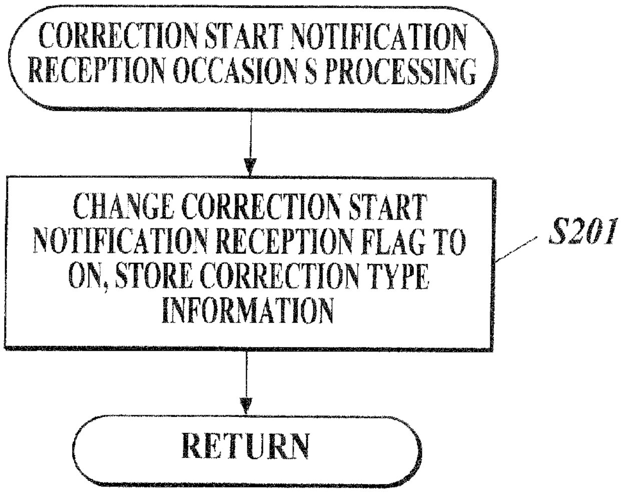
FIG. 7 is a flowchart showing correction start notification reception occasion (S) processing.

Next, the correction start notification reception occasion (S) processing performed in the second image forming apparatus 200 is described with reference to FIG. 7. The correction start notification reception occasion (S) processing is an interrupting processing performed when there is a correction start notification indicating start of correction from the first image forming apparatus 100 which is the master apparatus when the slave side print control processing is being performed.

First, when there is a correction start notification and the processing is performed, the control section 281 changes the correction start notification reception flag stored in the RAM 283 to ON and also stores the correction type information indicating the type of correction received with the correction start notification in a predetermined storage area of the RAM 283 (step S201). After performing processing of step S201, the control section 281 ends the processing and returns to the processing of the slave side print control processing before the interruption.

Figure 8:
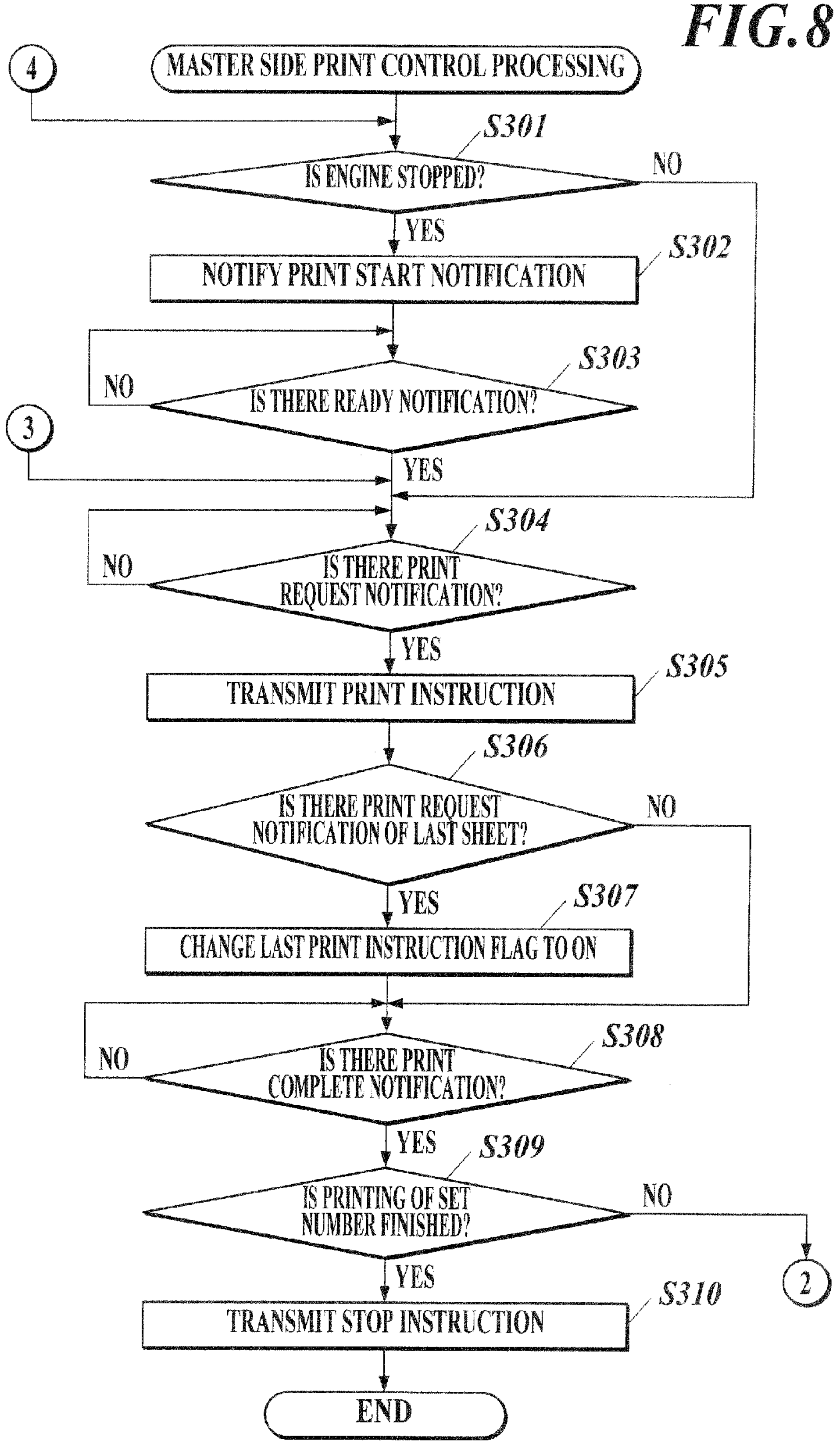
FIG. 8 is a flowchart showing master side print control processing.
Figure 9:
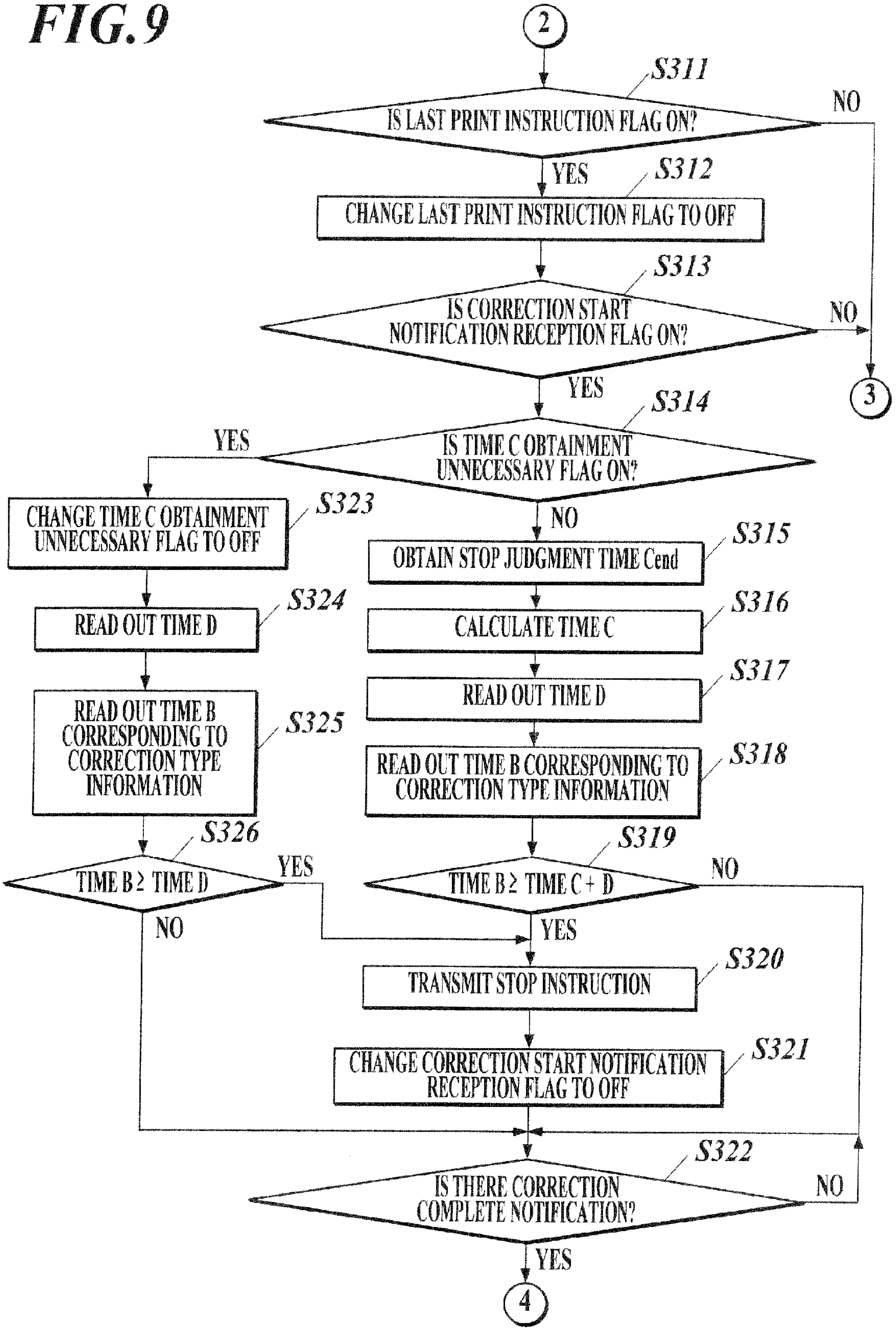
FIG. 9 is a flowchart showing master side print control processing.

Next, the master side print control processing performed in the first image forming apparatus 100 is described with reference to FIG. 8 to FIG. 9. The master side print control processing is processing performed after performing the transfer complete notification to the second image forming apparatus 200 which is the slave apparatus.

First, after the image data transfer complete notification is performed to the second image forming apparatus 200 and the processing is performed, the control section 181 judges whether or not the print engine is stopped (step S301). When it is judged that the print engine is stopped (step S301: YES), the control section 181 performs the print start notification to the print control section 120*a* (step S302). Then, the control section 181 waits for the ready notification from the print control section 120*a* (step S303), and performs the processing of step S304. When it is judged that the print engine is not stopped (step S301; NO), the control section 181 does not perform the processing of step S302 and step S303 and performs the processing of step S304.

The control section 181 waits for the print request notification from the print control section 120*a* (step S304) and transmits the print instruction to the print control section 120*a* (step S305).

Then, the control section 181 judges whether or not there is a notification indicating that the sheet is the last sheet with the reception of the print request notification in step S304 (step S306). In other words, the control section 181 judges whether or not it is the print request notification of the last sheet. When it is judged that it is the print request notification of the last sheet (step S306: YES), the control section 181 changes the last print instruction flag stored in a predetermined storage area of the RAM 183 to ON (step S307), and performs the processing of step S308. When it is judged that it is not the print request notification of the last sheet (step S306: NO), the control section 181 does not perform the processing of step S307 and performs the processing of step S308.

In step S308, the control section 181 waits for the print complete notification from the print control section 120*a* (step S308), and judges whether or not the image forming of the number of pages set in the job data is complete (step S309). In other words, the control section 181 judges whether or not all of the image forming in the job is performed. When it is judged that image forming of the set number of pages is complete (step S309: YES), the control section 181 performs a stop instruction notification to the print control section 120*a* (step S310) and ends the processing. When it is judged that the image forming of the set number of pages is not complete (step S309: NO), the control section 181 judges whether or not the last print instruction flag is ON as shown in FIG. 9 (step S311).

When it is judged that the last print instruction flag is ON (step S311: YES), the control section 181 changes the last print instruction flag stored in the RAM 183 to OFF (step S312). When it is judged that the last print instruction flag is not ON in step S311 (step S311: NO), the control section 181 performs processing of step S304.

Next, the control section 181 judges whether or not a later described correction start notification reception flag is ON (step S313). When it is judged that the correction start notification reception flag is ON (step S313: YES), the control section 181 judges whether or not a later described time (C) obtainment unnecessary flag is ON (step S314). When it is judged that the correction start notification reception flag is not ON (step S313: NO), the control section 181 performs the processing of step S304.

Then, when it is judged that the time (C) obtainment unnecessary flag is not ON in step S314 (step S314: NO), the control section 181 obtains the time stamp and this is to be the stop judgment time (Cend) (step S315) and the control section 181 calculates the time (C) which is the difference between the correction notification reception time (Cstart) obtained in a later described correction start notification reception occasion (M) processing, and the obtained stop judgment time (step S316). Here, time (C) indicates time from when correction start notification is received from the second image forming apparatus 200 to when there is a print complete notification of the last sheet from the print control section 120*a*.

Next, the control section 181 reads out the time (D) from the storage section 182 (step S317). Here, similar to the above described time (A), the time (D) is a constant number stored in the storage section 182 in a table and indicates a predicted time from when a stop instruction is transmitted and the print engine stops, the print start notification also performed at this timing and the print engine starts, until when the print engine is in a ready state. In the present embodiment, the time (D) is set to 25 seconds similar to the time (A), however, the time can be set freely according to the performance, etc. of the print engine.

Next, the control section 181 reads out time (B) corresponding to the information indicating a correction type transmitted from the second image forming apparatus 200 from the storage section 182 (step S318). Here, the time (B) is a constant number stored in the storage section 182 in a table as shown in FIG. 6B, and the time (B) indicates a predicted performing time of correction performed in the second image forming apparatus 200 (slave apparatus). The content of each correction and the predicted performing time are similar to those stored in the storage section 282 of the second image forming apparatus 200, and therefore the detailed description is omitted.

Then, the control section 181 compares the total of the calculated time (C) and time (D) (time (C+D)) with the time (B), and judges whether or not time (B) is the time (C+D) or more (step S319). When it is judged that the time (B) is the time (C+D) or more (step S319: YES), the control section 181 performs stop instruction notification to the print control section 120*a* (step S320), changes the correction start notification reception flag stored in the RAM 183 to OFF (step S321), waits for the correction complete notification from the slave apparatus (step S322) and performs the processing of step S301. When it is judged that the time (B) is not the time (C+D) or more in step S319 (step S319: NO), the control section 181 does not perform the processing of step S320 and step S321 and performs the processing of step S322.

When it is judged that the time (C) obtainment unnecessary flag is ON in step S314 (step S314: YES), the control section 181 changes the time (C) obtainment unnecessary flag stored in the RAM 183 to OFF (step S323), reads out the time (D) and the time (B) corresponding to the correction type (step S324 and step S325), and performs the processing of step S326. In step S326, the control section 181 compares the read out time (B) and time (D) and judges whether or not the time (B) is the time (D) or more (step S326). When it is judged that the time (B) is the time (D) or more (step S326: YES), the control section 181 performs the processing of step S320, and when it is judged that the time (B) is not the time (D) or more (step S326: NO), the processing of step S322 is performed.

Figure 10:
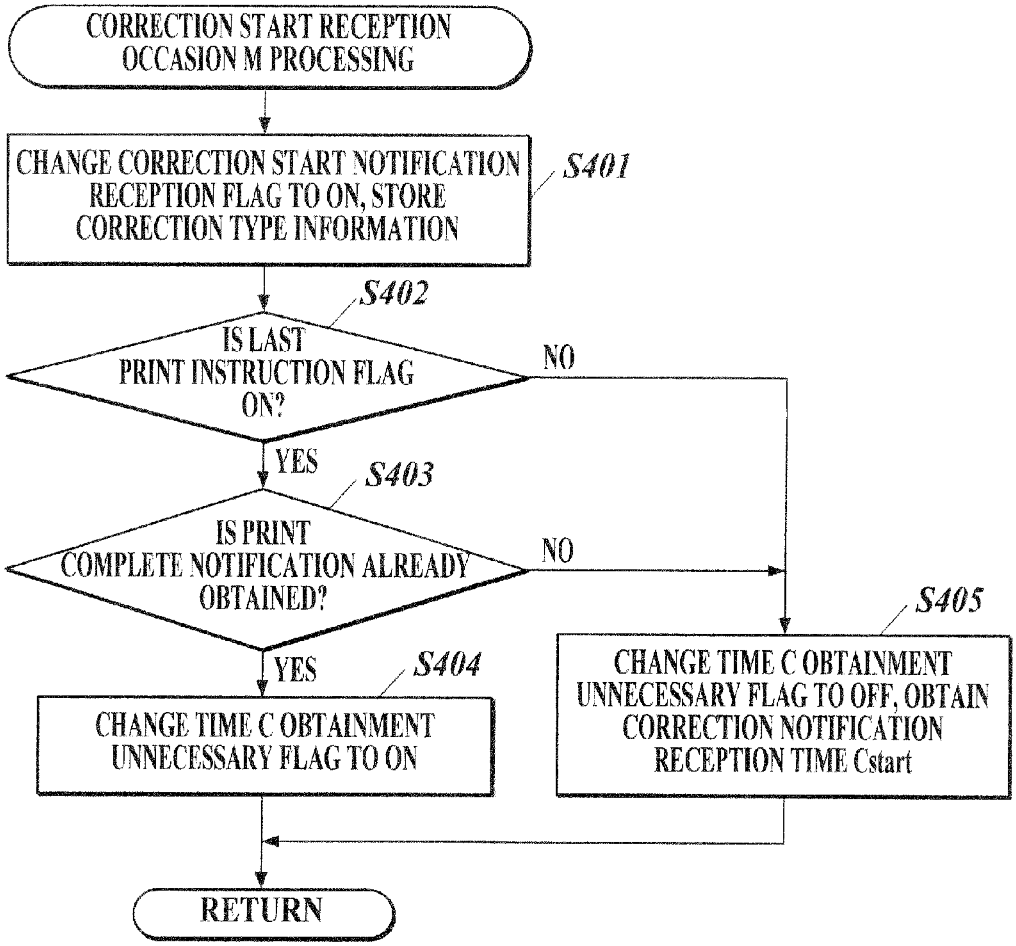
FIG. 10 is a flowchart showing correction start notification reception occasion (M) processing.

Next, the correction start notification reception occasion (M) processing performed in the first image forming apparatus 100 is described with reference to FIG. 10. The correction start notification reception occasion (M) processing is an interrupt processing performed when there is a correction start notification from the second image forming apparatus 200 which is the slave apparatus, while the master side print control processing is performed.

First, when there is a correction start notification and the processing is performed, the control section 181 changes the correction start notification reception flag stored in the RAM 183 to ON and stores the correction type information indicating the type of correction received with the correction start notification in a predetermined storage area of the RAM 183 (step S401). Next, the control section 181 judges whether or not the last print instruction flag is ON (step S402).

When it is judged that the last print instruction flag is ON (step S402: YES), the control section 181 judges whether or not the print complete notification is already obtained (step S403). The print complete notification obtained here is obtained after the print request notification of the last sheet is received, and therefore is the print complete notification of the last sheet. Then, when it is judged that the print complete notification is already obtained (step S403: YES), the control section 181 changes the time (C) obtainment unnecessary flag stored in a predetermined storage area of the RAM 183 to ON (step S404). After the print complete notification of the last sheet is received, since the time (C) becomes almost "0", the time (C) obtainment unnecessary flag is changed to ON, and the control burden can be made lighter by omitting the calculation of the time (C) in the master side print control processing as described above. When it is judged that the last print instruction flag is not ON (step S402: NO), and it is judged that the print complete notification is not already obtained (step S403: NO), the control section 181 changes the time (C) obtainment unnecessary flag to OFF, obtains the time stamp and this is to be a correction notification reception time (Cstart) and the correction notification reception time (Cstart) is stored in the RAM 183 (step S405). With this, it is possible to specify the time when the correction start notification is received.

After the processing of step S404 and step S405 are performed, the control section 181 ends the processing and returns to the processing before interruption in the master side print control processing.

The operation of the master apparatus (first image forming apparatus 100) and the slave apparatus (second image forming apparatus 200) when the correction is performed in the master apparatus in the image forming system 1 as described above is described with reference to FIG. 11 and FIG. 12. Here, FIG. 11 shows an example of stopping the print engine of the slave apparatus when the correction is in progress in the master apparatus, and FIG. 12 shows an example of not stopping the print engine of the slave apparatus when the correction is in progress in the master apparatus.

Figure 11:
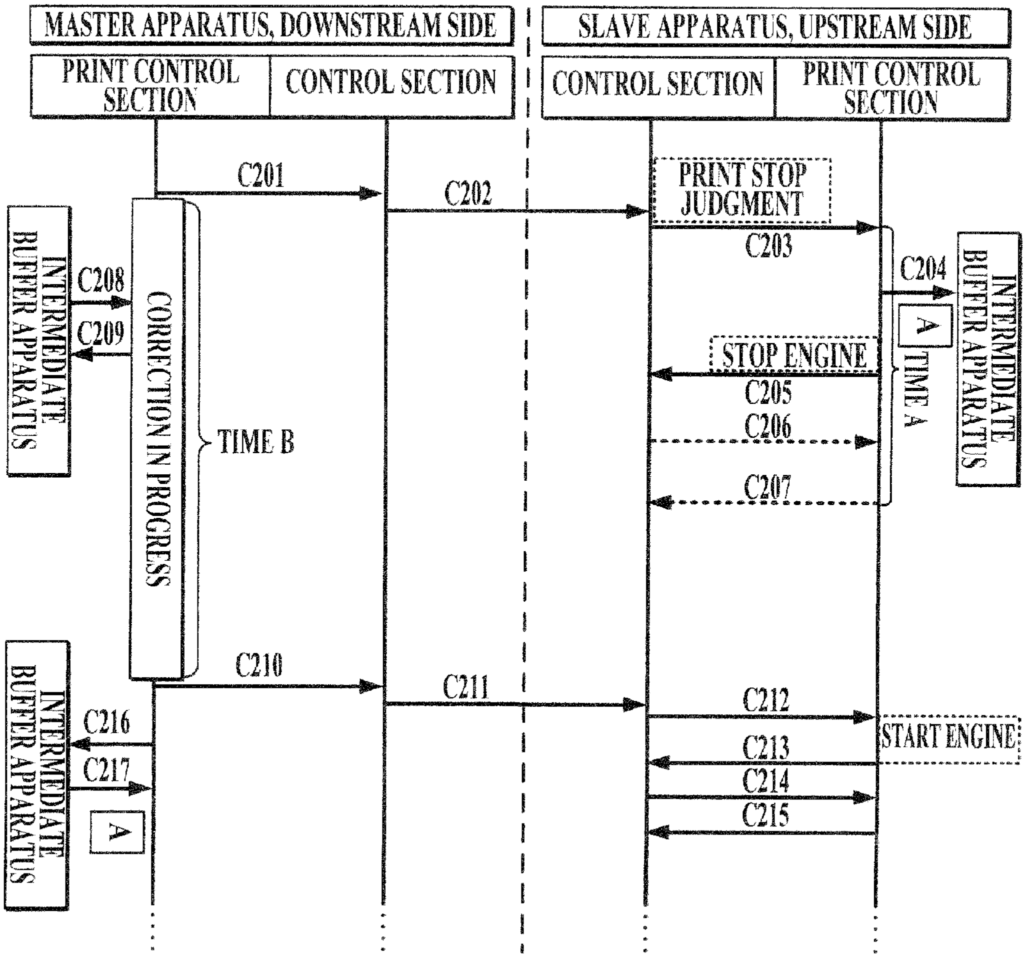
FIG. 11 is a diagram for explaining operation of an image forming apparatus when correction is performed.
Figure 12:
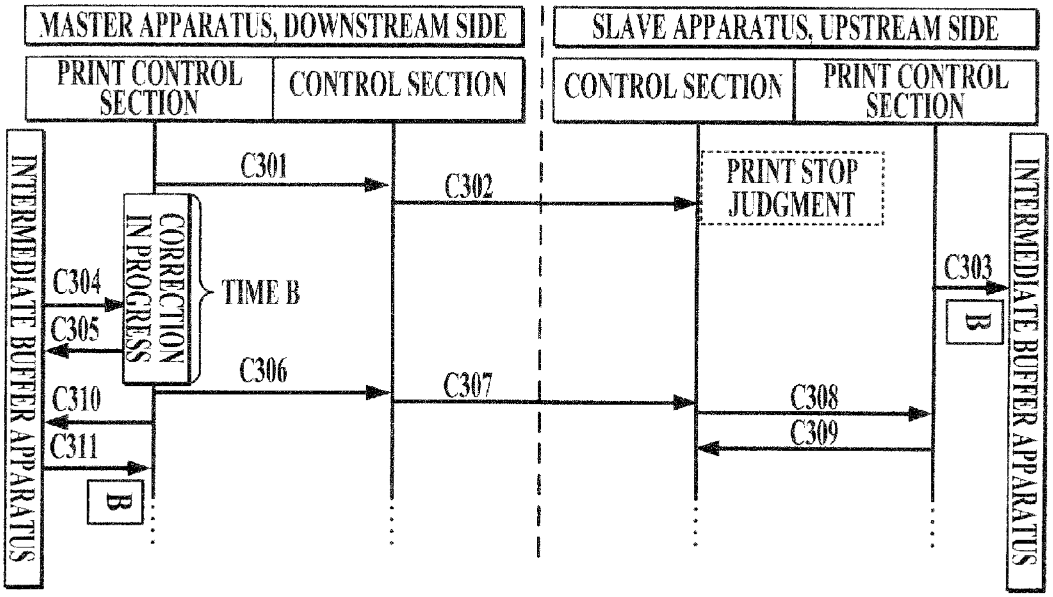
FIG. 12 is a diagram for explaining operation of an image forming apparatus when correction is performed.

First, in the example shown in FIG. 11, the print control section 120*a* of the master apparatus performs a correction start notification to the control section 181 at the timing of starting correction (step C201). The processing performed is to be stabilization C. Then, the control section 181 transmits the correction start notification to the slave apparatus (step C202). When the correction start notification is received, the control section 281 of the slave apparatus reads out the time (A) and the time (B) and judges whether or not to stop the print engine as described above.

Since the time (B) is larger than the time (A), the control section 281 of the slave apparatus judges to stop the print engine, and transmits a stop instruction to the print control section 220*a* (step C203). Then, the print control section 220*a* discharges the paper A on which the image forming processing is performed to the intermediate buffer apparatus 300 and performs paper discharge notification (step C204). After the discharge of the paper A is complete, the print control section 220*a* stops the print engine and performs the engine stop complete notification to the control section 281 (step C205). Here, when there are a plurality of sheets of paper on which image forming processing is performed, after discharge of all of the sheets is complete, the print engine is stopped. As shown in FIG. 11, the time (A) indicates the predicted time of, receiving a correction start notification and transmitting a stop instruction in step C202, completing the discharge of paper in the slave apparatus and stopping the print engine, the control section 281 receiving an engine stop complete notification in step C205 and performing a print start notification at this timing (step C206) and starting the print engine and transmitting a ready notification from the print control section 220*a* (step C207). In the example described in FIG. 11, step C206 and step C207 are virtually performed and not actually performed.

In the intermediate buffer apparatus 300, when the paper A is received, the intermediate buffer control section 300*a* performs a paper discharge inquiry to the print control section 120*a* of the master apparatus (step C208). In this case, since the correction is in progress in the master apparatus and the paper cannot be received, the print control section 120*a* performs a paper discharge prohibition notification to the intermediate buffer control section 300*a* (step C209).

Then, the print control section 120*a* of the master apparatus performs a correction complete notification to the control section 181 at the timing of completing correction (step C210). Then, the control section 181 of the master apparatus transmits the correction complete notification to the slave apparatus (step C211). When the correction complete notification is received, the control section 281 of the slave apparatus performs a print start notification to the print control section 220*a* in order to start the stopped print engine (step C212). Then, when the print start notification is received, the print control section 220*a* starts the print engine, and when the start of the print engine is complete and the print engine is in a state where image forming is possible, the control section 281 performs a ready notification (step C213).

Then, when the ready notification is received, the control section 281 of the slave apparatus transmits a paper feeding instruction to resume the interrupted job to the print control section 220*a* (step C214). After the paper feeding instruction is received and the paper feeding is performed, the print control section 220*a* performs a paper feeding complete notification to the control section 281 (step C215). Then, the slave apparatus continues the job as described above.

After the correction complete notification is transmitted, the print control section 120*a* of the master apparatus performs a paper discharge authorization notification to the intermediate buffer apparatus 300 (step C216). Then, when the paper discharge authorization notification is received, the intermediate buffer control section 300*a* sends out the paper A stacked in the buffer section 310 to the first image forming apparatus 100 and also performs a paper discharge notification of the paper A to the print control section 120*a* of the master apparatus (step C217). Then, the master apparatus continues the job as described above.

As described above, when the correction time in the master apparatus is longer than the time until the print engine of the slave apparatus is in a ready state again after the print engine of the slave apparatus is stopped, the deterioration of material and waste of energy of the apparatus occurring due to the apparatus being in a ready state for a long period of time can be suppressed by stopping the print engine and starting after correction is complete.

Next, the example shown in FIG. 12 is described. First, the print control section 120*a* of the master apparatus performs a correction start notification to the control section 181 at the timing of starting the correction (step C301). The correction performed is to be stabilization A. Then, the control section 181 transmits the correction start notification to the slave apparatus (step C302). When the correction start notification is received, the control section 281 of the slave apparatus reads out the time (A) and the time (B) and judges whether or not to stop the print engine as described above.

Since the time (B) is smaller than the time (A), the control section 281 of the slave apparatus judges not to stop the print engine and waits for a correction complete notification from the master apparatus. Then, the print control section 220*a* discharges the paper B on which image forming processing is performed to the intermediate buffer apparatus 300 and performs a paper discharge notification (step C303). After the discharge of the paper B is complete, since the stop instruction is not transmitted, the print control section 220*a* allows the print engine to standby in the ready state.

In the intermediate buffer apparatus 300, when the paper B is received, the intermediate buffer control section 300*a* performs a paper discharge inquiry to the print control section 120*a* of the master apparatus (step C304). In this case, since the correction is in progress in the master apparatus and the paper cannot be received, the print control section 120*a* performs a paper discharge prohibition notification to the intermediate buffer control section 300*a* (step C305).

Then, the print control section 120*a* of the master apparatus performs a correction complete notification to the control section 181 at the timing of completing correction (step C306). Then, the control section 181 of the master apparatus transmits the correction complete notification to the slave apparatus (step C307). When the correction complete notification is received, since the print engine is in a ready state, the control section 281 of the slave apparatus transmits a paper feeding instruction to resume the interrupted job to the print control section 220*a* (step C308). After the paper feeding instruction is received and the paper feeding is performed, the print control section 220*a* performs the paper feeding complete notification to the control section 281 (step C309). Then, the slave apparatus continues the job as described above.

After the correction complete notification is transmitted, the print control section 120*a* of the master apparatus performs a paper discharge authorization notification to the intermediate buffer apparatus 300 (step C310). Then, when the paper discharge authorization notification is received, the intermediate buffer control section 300*a* sends out the paper B stacked in the buffer section 310 to the first image forming apparatus 100 and also performs a paper discharge notification of the paper B to the print control section 120*a* of the master apparatus (step C311). Then, the master apparatus continues the job as described above.

As described above, when the correction time of the master apparatus is shorter than the time until the print engine of the slave apparatus is in a ready state again after the print engine of the slave apparatus is stopped, the interrupted job can be speedily resumed after correction and productivity is enhanced by maintaining the print engine in a ready state.

Figure 14:
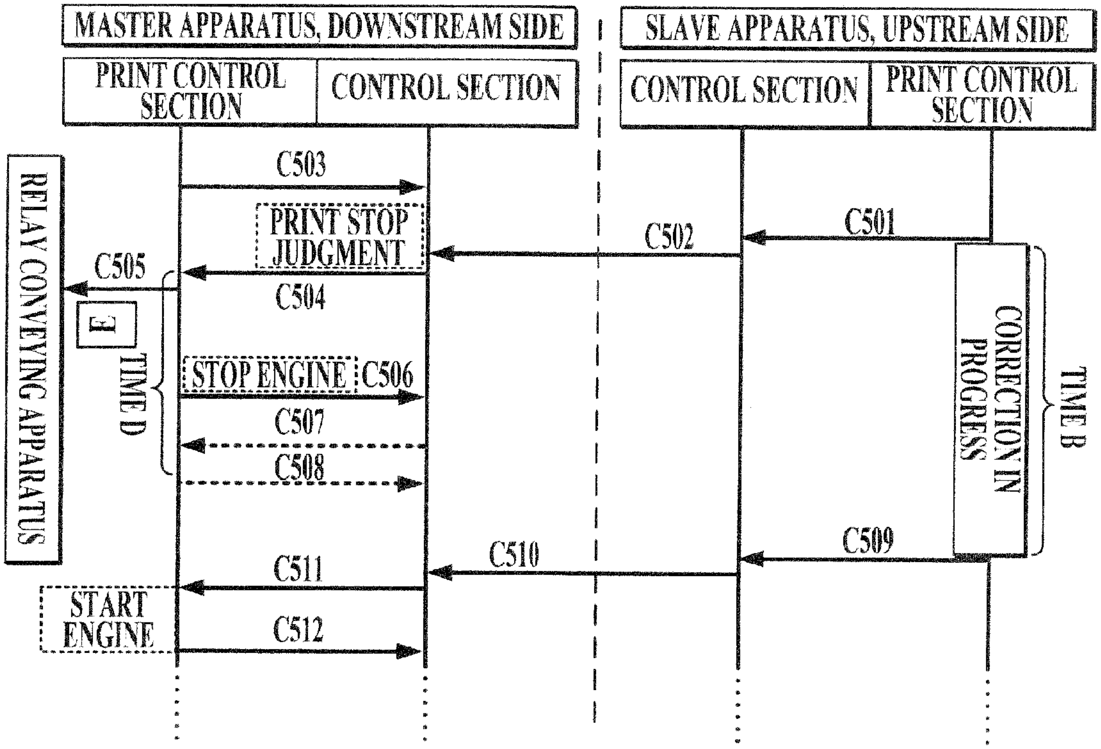
FIG. 14 is a diagram for explaining operation of an image forming apparatus when correction is performed.
Figure 15:
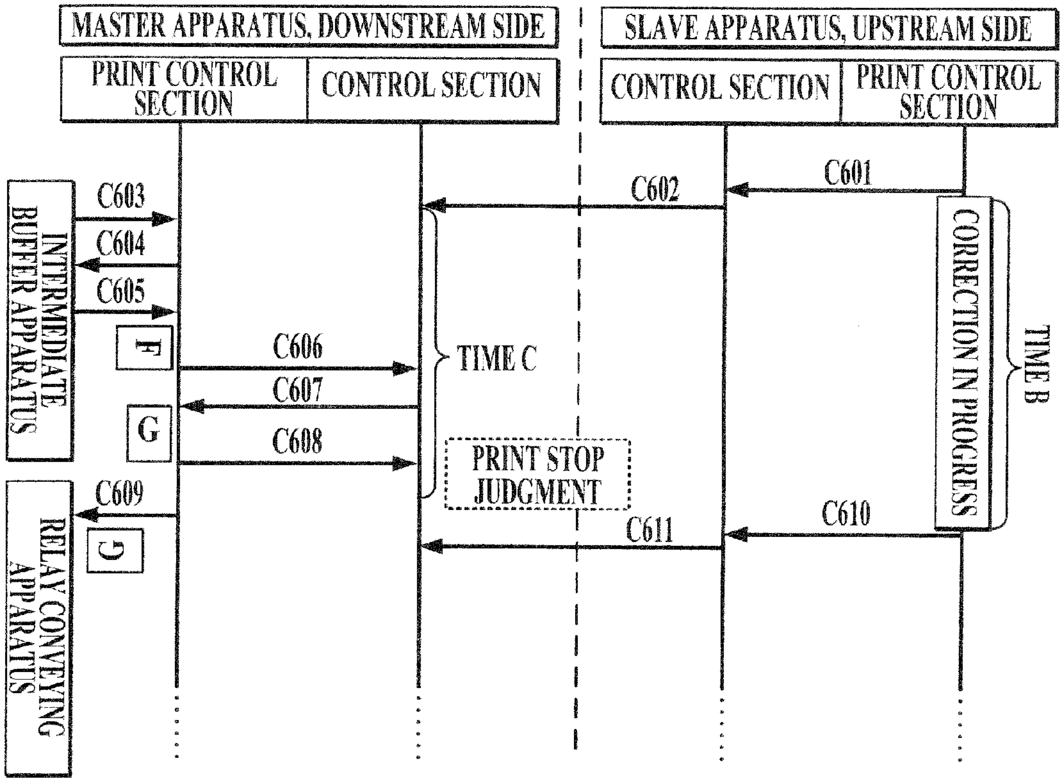
FIG. 15 is a diagram for explaining operation of an image forming apparatus when correction is performed.

Next, the operation of the master apparatus and the slave apparatus when correction is performed in the slave apparatus is described with reference to FIG. 13 to FIG. 15. Here, FIG. 13 shows an example of stopping the print engine of the master apparatus after the master apparatus performs the processing on the paper on which the image forming is performed by the slave apparatus when the correction is in progress in the slave apparatus, FIG. 14 shows an example of stopping the print engine of the master apparatus when the correction is in progress in the slave apparatus and the correction in the slave apparatus is started after the print complete notification of the last sheet is received in the master apparatus, and FIG. 15 shows an example of not stopping the print engine of the master apparatus after the master apparatus performs the processing on the paper on which the image forming is performed by the slave apparatus when the correction is in progress in the slave apparatus.

Figure 13:
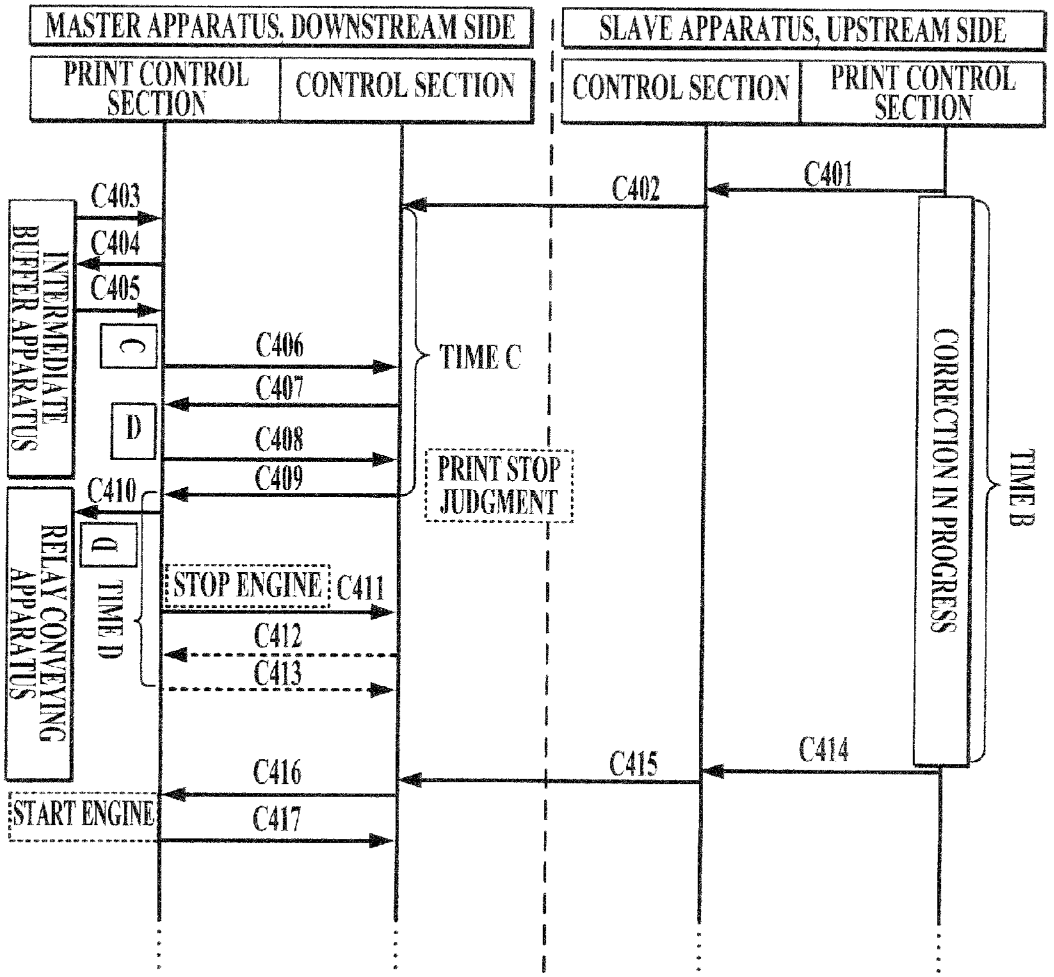
FIG. 13 is a diagram for explaining operation of an image forming apparatus when correction is performed.

First, in the example shown in FIG. 13, the print control section 220*a* of the slave apparatus performs a correction start notification to the control section 281 at the timing of starting the correction (step C401). The correction performed is to be stabilization C. Then, the correction section 281 transmits the correction start notification to the master apparatus (step C402). When the correction start notification is received, since the print complete notification of the last sheet is not received, the control section 181 of the master apparatus obtains the correction notification reception time (Cstart) and waits for the print request notification from the print control section 120*a*.

In the intermediate buffer apparatus 300, the paper C is received from the slave apparatus, the intermediate buffer control section 300*a* performs a paper discharge inquiry notification to the print control section 120*a* of the master apparatus (step C403). When the paper discharge inquiry notification is received from the intermediate buffer control section 300*a*, the print control section 120*a* of the master apparatus performs a paper discharge authorization notification to the intermediate buffer control section 300*a* (step C404). Then, when the paper discharge authorization notification is received, the intermediate buffer control section 300*a* sends out the paper C stacked in the buffer section 310 to the master apparatus and also performs a paper discharge notification of the paper C to the print control section 120*a* of the master apparatus (step C405). Together with the paper discharge notification, a notification indicating the last sheet is also performed.

When the paper C is conveyed from the intermediate buffer apparatus 300, the print control section 120*a* of the master apparatus performs a print request notification for the paper C to the control section 181 (step C406). Together with the print request notification, a notification indicating the last sheet is also performed.

Then, when the print request notification is received, the control section 181 of the master apparatus transmits a print instruction to the print control section 120*a* to perform the image forming on the paper C (step C407). When the print instruction is received, the print control section 120*a* allows the image forming section 121 to perform the image forming on the paper C. Here, the paper C after the image is formed is to be paper D. Then, when the image forming on the paper D is finished, the print control section 120*a* performs a print complete notification to the control section 181 (step C408). When the print complete notification is received, the control section 181 of the master apparatus obtains the stop judgment time (Cend) and calculates the time (C) and also reads out the time (B) and the time (D). The control section 181 judges whether or not to stop the print engine based on the above.

Since the time (B) is larger than the time (C+D), the control section 181 of the master apparatus judges to stop the print engine and transmits a stop instruction to the print control section 120*a* (step C409). Then, the print control section 120*a* discharges the paper D to the relay conveying apparatus 500 (step C410), stops the print engine at the timing when the post processing by the post processing apparatus 600 is complete, and performs engine stop complete notification to the control section 181 (step C411). Here, when a plurality of pieces of paper are accumulated in the intermediate buffer apparatus 300, in other words, when the image forming processing is performed in the slave apparatus but there are a plurality of pieces of paper on which the image forming processing by the master apparatus is not performed, the print engine is stopped after the post processing of all of the sheets of paper is complete. As shown in FIG. 13, the time (D) indicates the predicted time of, receiving a print complete notification of the last sheet in step C408 and transmitting a stop instruction, completing post processing on the paper processed in the master apparatus and stopping the print engine, the control section 181 receiving the engine stop complete notification in step C411 and performing a print start notification at this timing (step C412), and starting the print engine and transmitting a ready notification from the print control section 120*a* (step C413). In the example shown in FIG. 13, step C412 and step C413 are virtually performed and not actually performed.

Then, the print control section 220*a* of the slave apparatus performs a correction complete notification to the control section 281 at the timing of completing correction (step C414). Then, the correction section 281 of the slave apparatus transmits the correction complete notification to the master apparatus (step C415). Then, the slave apparatus resumes the interrupted job and continues to perform the resumed job as described above.

When the correction complete notification is received, the control section 181 of the master apparatus performs a print start notification to the print control section 120*a* in order to start the stopped print engine (step C416). Then, when the print start notification is received, the print control section 120*a* starts the print engine, and when the start of the print engine is complete and the print engine is in a state where image forming is possible, the print control section 120*a* performs a ready notification to the control section 181 (step S417). Then, the master apparatus resumes the interrupted job and continues to perform the resumed job as described above.

As described above, when the correction time of the slave apparatus is longer than the time until the print complete notification of the last sheet after receiving the correction start notification of the master apparatus (in other words, the time until performing judgment of whether or not to stop the print engine after correction start notification) and the time until the print engine is in a ready state again after stopping the print engine, the deterioration of material and waste of energy of the apparatus occurring due to the apparatus being in a ready state for a long period of time can be suppressed by stopping the print engine and starting after correction is complete.

Next, the example shown in FIG. 14 is described. First, the print control section 220*a* of the slave apparatus performs a correction start notification to the control section 281 at the timing of starting correction (step C501). The correction performed is to be stabilization C. The control section 281 transmits a correction start notification to the master apparatus (step C502). Since the print complete notification of the last sheet is received from the print control section 120*a* before receiving the correction start notification (step C503), at the timing of receiving the correction start notification, the control section 181 of the master apparatus reads out the time (B) and the time (D) and judges whether or not to stop the print engine.

Since the time (B) is larger than the time (D), the control section 181 of the master apparatus judges to stop the print engine and transmits a stop instruction to the print control section 120*a* (step C504). Then, the print control section 120*a* discharges paper E on which image forming processing in the master apparatus is complete to the relay conveying apparatus 500 (step C505), stops the print engine at the timing that the post processing by the post processing apparatus 600 is complete, and performs an engine stop complete notification to the control section 181 (step C506). As shown in FIG. 14, the time (D) indicates the predicted time of, receiving a correction start notification in step C502, transmitting the stop instruction based on the stop judgment of the print engine, completing the post processing on the paper processed in the master apparatus and stopping the print engine, the control section 181 receiving an engine stop complete notification in step C506 and at this timing performing a print start notification (step C507), and starting the print engine and transmitting a ready notification from the print control section 120*a* (step C508). In the example shown in FIG. 14, step C507 and step C508 are virtually performed, and are not actually performed.

The print control section 220*a* of the slave apparatus performs a correction complete notification to the control section 281 at the timing of completing correction (step C509). Then, the control section 281 of the slave apparatus transmits the correction complete notification to the master apparatus (step C510). Then, the slave apparatus resumes the interrupted job and continues to perform the resumed job as described above.

When the correction complete notification is received, the control section 181 of the master apparatus performs a print start notification to the print control section 120*a* in order to start the stopped print engine (step C511). Then, when the print start notification is received, the print control section 120*a* starts the print engine and when the start of the print engine is complete and the print engine is in a state where image forming is possible, the print control section 120*a* performs a ready notification to the control section 181 (step S512). Then, the master apparatus resumes the interrupted job and continues to perform the resumed job as described above.

As described above, when the correction is started after the print complete notification of the last sheet is performed, and the correction time of the slave apparatus is longer than the time until the print engine is in a ready state again after the print engine is stopped, the deterioration of material and waste of energy of the apparatus occurring due to the apparatus being in a ready state for a long period of time can be suppressed by stopping the print engine and starting after correction is complete.

Next, the example shown in FIG. 15 is described. First, the print control section 220*a* of the slave apparatus performs a correction start notification to the control section 281 at the timing of starting correction (step C601). The correction performed is to be stabilization B. Then, the control section 281 transmits the correction start notification to the master apparatus (step C602). When the correction start notification is received, since the print complete notification of the last sheet is not received, the control section 181 of the master apparatus obtains the correction notification reception time (Cstart) and waits for the print request notification from the print control section 120*a*.

Then, in the intermediate buffer apparatus 300, since the paper F is received from the slave apparatus, the intermediate buffer control section 300*a* performs a paper discharge inquiry notification to the print control section 120*a* of the master apparatus (step C603). When the paper discharge inquiry notification is received from the intermediate buffer control section 300*a*, the print control section 120*a* of the master apparatus performs a paper discharge authorization notification to the intermediate buffer control section 300*a* (step C604). Then, when the paper discharge authorization notification is received, the intermediate buffer control section 300*a* sends out the paper F stacked in the buffer section 310 to the master apparatus and also performs a paper discharge notification of the paper F to the print control section 120*a* of the master apparatus (step S605). Together with the paper discharge notification, a notification indicating that the paper is the last sheet is also performed.

When the paper F is conveyed from the intermediate buffer apparatus 300, the print control section 120*a* of the master apparatus performs a print request notification of the paper F to the control section 181 (step C606). Together with the print request notification, a notification indicating that the paper is the last sheet is also performed.

Then, when the print request notification is received, the control section 181 of the master apparatus transmits a print instruction to the print control section 120*a* to perform image forming on the paper F (step C607). When the print instruction is received, the print control section 120*a* allows the image forming section 121 to perform image forming on the paper F. Here, the paper F after the image is formed is to be paper G. Then, when the image forming on the paper G is finished, the print control section 120*a* performs a print complete notification to the control section 181 (step C608). When the print complete notification is received, the control section 181 of the master apparatus obtains the stop judgment time (Cend) and calculates the time (C) and also reads out the time (B) and the time (D). The control section 181 judges whether or not to stop the print engine based on the above.

Since the time (B) is smaller than the time (C+D), the control section 181 of the master apparatus judges not to stop the print engine and waits for the correction complete notification from the slave apparatus. Then, the print control section 120*a* discharges the paper G on which image forming processing is complete to the relay conveying apparatus 500 (step C609). After the discharge of the paper G is complete, since the stop instruction is not transmitted, the print control section 120*a* allows the print engine to standby in a ready state.

Then, at the timing of completing correction, the print control section 220*a* of the slave apparatus performs a correction complete notification to the control section 281 (step C610). Then, the control section 281 of the slave apparatus transmits the correction complete notification to the master apparatus (step C611). Then, the slave apparatus resumes the interrupted job and continues to perform the resumed job as described above.

After the correction complete notification is received, the control section 181 of the master apparatus resumes the interrupted job and continues to perform the resumed job as described above.

According to an aspect of the preferred embodiments of the present invention, there is provided a first image forming apparatus 100 and a second image forming apparatus 200, each including image forming sections 121 and 221, and control sections 181 and 281, respectively. The image forming sections 121 and 221 form an image on paper. When a predetermined adjustment condition occurs, the control sections 181 and 281 stop the image forming operation by the image forming sections 121 and 221, perform predetermined adjustment, resumes the image forming operation by the image forming sections 181 and 281 after the adjustment is complete, and performs notification that adjustment is performed to the other image forming apparatus among the first image forming apparatus 100 and the second image forming apparatus 200 when the adjustment is performed. When there is a notification that the adjustment is performed from the other image forming apparatus among the first image forming apparatus 100 and the second image forming apparatus 200, the control sections 181 and 281 stop the driving of the image forming sections 121 and 221 when the adjustment is in progress in the other image forming apparatus and put the image forming sections 121 and 221 in a driving stopped state.

Consequently, in any one of the plurality of image forming apparatuses, while an adjustment in which the image forming operation cannot be continuously performed is in progress, the image forming section of the other image forming apparatus is in a driving stopped state, idle driving is not performed for a long period of time and the deterioration of material and waste of energy of the apparatus in the image forming apparatus can be suppressed and is therefore efficient.

According to the present embodiment, when there is a notification that adjustment is performed from the other image forming apparatus, the control sections 181 and 281 of the first image forming apparatus 100 and the second image forming apparatus 200 each specify time necessary for adjustment. When the specified time is less than a predetermined judgment time, the control sections 181 and 281 do not stop the driving of the image forming sections 121 and 221 and put the image forming sections 121 and 221 on standby in a ready state until the adjustment is complete.

Consequently, the down time from when the adjustment is complete to when the image forming operation is resumed can be suppressed, and reduction of productivity due to adjustment can be suppressed.

According to the present embodiment, the control sections 181 and 281 of the first image forming apparatus 100 and the second image forming apparatus 200 can each perform a plurality of types of adjustment. The control sections 181 and 281 perform notification that adjustment is performed to the other image forming apparatus so that it is possible to specify the type of adjustment. When there is a notification that the adjustment is performed from the other image forming apparatus, the control sections 181 and 281 specify the time necessary for adjustment from the type of judgment specified in the notification.

Consequently, it is possible to judge whether to put the image forming section in a driving stopped state or a ready state according to a content of the adjustment and then the image forming section is put in a certain state, therefore productivity can be maintained and the image forming apparatus can be operated efficiently.

According to the present embodiment, when there is a notification that the adjustment is performed from the second image forming apparatus 200 provided in an upstream side of a paper conveying direction among the first image forming apparatus 100 and the second image forming apparatus 200, after the image forming processing by the image forming section 121 is performed on a paper discharged from the second image forming apparatus 200 provided in the upstream side, when the time specified from the type of the adjustment specified from the notification that the adjustment is performed from the second image forming apparatus 200 provided in the upstream side is less than the time in which performing time of the image forming processing is added to the predetermined judgment time, the control section 181 of the first image forming apparatus 100 provided in a downstream side puts the image forming section 121 on standby in the ready state. When there is a notification that the adjustment is performed from the first image forming apparatus 100 provided in the downstream side, when the time specified from the type of adjustment specified from the notification that the adjustment is performed from the first image forming apparatus 100 provided in the downstream side is less than the predetermined judgment time, the control section 281 of the second image forming apparatus 200 provided in the upstream side puts the image forming section 221 on standby in the ready state.

Consequently, in each of the plurality of image forming apparatuses where different image forming operation is performed between the upstream side and the downstream side, it is possible to suitably judge whether or not to put the image forming section in a driving stopped state while adjustment is in progress and the image forming apparatus can be operated efficiently.

According to the present embodiment, each of the control sections 181 and 281 of the first image forming apparatus 100 and the second image forming apparatus 200 is able to perform a plurality of types of adjustment. The control sections 181 and 281 perform the notification that the adjustment is performed to the other image forming apparatus so that it is possible to specify the type of the adjustment. When there is a notification from the other image forming apparatus that the adjustment is performed, the control sections 181 and 281 judge whether or not to put the image forming sections 121 and 221 in the driving stopped state based on the type of adjustment specified by the notification. When it is judged to put the image forming sections 121 and 221 in the driving stopped state, the control sections 181 and 281 put the image forming sections 121 and 221 in the driving stopped state. When it is judged not to put the image forming sections 121 and 221 in the driving stopped state, the control section 181 and 281 do not stop the driving of the image forming sections 121 and 221, and the image forming sections 121 and 221 are put on standby in the ready state until the adjustment is complete.

Consequently, it is possible to judge whether to put the image forming section in a driving stopped state or a ready state according to a content of the adjustment and then the image forming section is put in a certain state, therefore productivity can be maintained and the image forming apparatus can be operated efficiently.

According to the present embodiment, the intermediate buffer apparatus 300 is provided between the first image forming apparatus 100 and the second image forming apparatus 200. The intermediate buffer apparatus 300 receives and accumulates paper discharged from the second image forming apparatus 200 provided in an upstream side of a paper conveying direction. The intermediate buffer apparatus 300 sends out the accumulated paper to the image forming apparatus 100 provided in a downstream side. The control sections 181 and 281 of the first image forming apparatus 100 and the second image forming apparatus 200 each discharges the paper on which image forming processing is performed by the image forming sections 121 and 221 outside the apparatus, and then puts the image forming sections 121 and 221 in the driving stopped state.

Consequently, it is possible to accumulate paper on which image forming processing is performed by the image forming apparatus provided in the upstream side, and the plurality of image forming apparatuses can each control operation of adjustment in a state where the paper is discharged, and therefore the processing becomes easier.

The description of the embodiment of the present invention is one example of the image forming system of the present invention and is not limited to the above. The specific configuration and the specific operation of each functional section composing the image forming system can be suitably modified.

In the present embodiment, the image forming apparatus positioned in the upstream side is the slave apparatus and the image forming apparatus positioned in the downstream side is the master apparatus, however, the image forming apparatus positioned in the upstream side can be the master apparatus and the image forming apparatus positioned in the downstream side can be the slave apparatus.

The image forming system of the present embodiment is composed of two image forming apparatuses, however, the image forming system can be composed of three or more image forming apparatuses.

In the present embodiment, an intermediate buffer apparatus is provided, and the paper on which image forming processing is performed by the image forming apparatus provided in the upstream side can be accumulated, however, a mechanism of accumulating the paper in any one of the plurality of image forming apparatuses can be provided and the paper can be accumulated by such mechanism instead of providing an intermediate buffer apparatus.

In the present embodiment, when the performing time of the correction is shorter than the time of stopping driving of the print engine, starting the print engine and becoming the ready state, the driving of the print engine is not stopped, however, the driving of the print engine can be stopped regardless of the performing time of the correction.

In the present embodiment, when the correction is performed in the image forming apparatus in the downstream side, the correction complete notification is transmitted to the image forming apparatus of the upstream side at the timing of completing the correction, however, the time for starting the print engine can be considered, and control can be performed so that the correction complete notification is transmitted at a predetermined time before the correction is complete, and the correction is complete when the start of the print engine is complete. With this, the productivity can be enhanced even more.

In the present embodiment, it is described that the driving of the print engine of one image forming apparatus is stopped when the correction in the other image forming apparatus is performed, however, when the driving of an optional apparatus such as a post processing apparatus, etc. is controlled together with any of the plurality of the image forming apparatuses, the driving of the print engine of the one image forming apparatus can be stopped when the correction is performed in the optional apparatus.

In the present embodiment, as a computer readable medium including a program of the present invention, an example using a hard disk or a nonvolatile semiconductor memory is disclosed, however it is not limited to this example. As other computer readable mediums, a portable recording medium such as a CD-ROM, etc. can be applied. Moreover, as a medium providing data of the program of the present invention through a communication line, a carrier wave can also be applied.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present application is based on Japanese Patent Application No. 2010-201505 filed on Sep. 9, 2010 to the Japanese Patent Office, which shall be a basis for correcting mistranslations.

What is claimed is:

1. An image forming system comprising:

a plurality of image forming apparatuses provided in a series so that each of the plurality of image forming apparatuses forms an image on a sheet of paper, wherein each of the plurality of image forming apparatuses comprises:

an image forming section which forms an image on the paper; and a control section which, when a predetermined adjustment condition occurs, stops an image forming operation by the image forming section, performs a predetermined adjustment, resumes the image forming operation by the image forming section after the adjustment is complete, and performs a notification that the adjustment is performed to another image forming apparatus from among the plurality of image forming apparatuses when the adjustment is performed, and when there is a notification that the adjustment is performed from the another image forming apparatus from among the plurality of image forming apparatuses, stops driving of the image forming section and puts the image forming section in a driving stopped state while the adjustment is performed in the another image forming apparatus.

2. The image forming system of claim 1, wherein the control section of each of the plurality of image forming apparatuses specifies a time necessary for the adjustment when there is the notification that the adjustment is performed from the another image forming apparatus, and when the specified time is less than a predetermined judgment time, the driving of the image forming section is not stopped and the image forming section is on standby in a ready state until the adjustment is complete.

3. The image forming system of claim 2, wherein the control section of each of the plurality of image forming apparatuses is configured to perform control of a plurality of types of adjustment, and performs the notification that the adjustment is performed to the another image forming apparatus so that it is possible to specify the type of the adjustment, and when there is a notification from the another image forming apparatus that the adjustment is performed, specifies the time necessary for the adjustment based on the type of adjustment specified by the notification.

4. The image forming system of claim 3, wherein:

when there is a notification that the adjustment is performed from an image forming apparatus provided in an upstream side of a paper conveying direction from among the plurality of image forming apparatuses, after the image forming processing by the image forming section is performed on a paper discharged from the image forming apparatus provided in the upstream side, and when the time specified from the type of the adjustment specified from the notification that the adjustment is performed from the image forming apparatus provided in the upstream side is less than a time in which a performing time of the image forming processing is added to the predetermined judgment time, the control section of an image forming apparatus provided in a downstream side puts the image forming section on standby in the ready state; and when there is a notification that the adjustment is performed from the image forming apparatus provided in the downstream side, and when the time specified from the type of adjustment specified from the notification that the adjustment is performed from the image forming apparatus provided in the downstream side is less than the predetermined judgment time, the control section of the image forming apparatus provided in the upstream side puts the image forming section on standby in the ready state.

5. The image forming system of claim 1, wherein the control section of each of the plurality of image forming apparatuses is configured to perform control of a plurality of types of adjustment, and performs the notification that the adjustment is performed to the another image forming apparatus so that it is possible to specify the type of the adjustment, and when there is a notification from the another image forming apparatus that the adjustment is performed, judges whether or not to put the image forming section in the driving stopped state based on the type of adjustment specified by the notification and when it is judged to put the image forming section in the driving stopped state, the image forming section is put in the driving stopped state, and when it is judged not to put the image forming section in the driving stopped state, the driving of the image forming section is not stopped, and the image forming section is put on standby in the ready state until the adjustment is complete.

6. The image forming system of claim 1, wherein the adjustment comprises image stabilizing processing to stabilize image forming in the image forming section.

7. The image forming system of claim 1, further comprising an accumulating apparatus which is provided between the plurality of image forming apparatuses, which receives and accumulates paper discharged from an image forming apparatus provided in an upstream side of a paper conveying direction and which sends out the accumulated paper to an image forming apparatus provided in a downstream side, wherein the control section of each of the plurality of image forming apparatuses controls so as to discharge the paper on which image forming processing has been performed by the image forming section to outside the apparatus, and then puts the image forming section in the driving stopped state.

* * * * *